(12) United States Patent
Terada et al.

(10) Patent No.: US 7,339,748 B2
(45) Date of Patent: Mar. 4, 2008

(54) VARIABLE MAGNIFICATION OPTICAL SYSTEM

(75) Inventors: Mamoru Terada, Sakai (JP); Toru Nakatani, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 0 days.

(21) Appl. No.: 11/235,623

(22) Filed: Sep. 26, 2005

(65) Prior Publication Data

US 2006/0291070 A1    Dec. 28, 2006

(30) Foreign Application Priority Data

Jun. 28, 2005   (JP)  ............................. 2005-187555

(51) Int. Cl.
*G02B 15/14* (2006.01)

(52) U.S. Cl. ...................................... 359/687; 359/676

(58) Field of Classification Search ................ 359/687, 359/676

See application file for complete search history.

(56) References Cited

U.S. PATENT DOCUMENTS 6,061,186 A * 5/2000 Nishio ......................... 359/684

6,498,687 B1 * 12/2002 Sekita et al. ................. 359/680
6,577,450 B2 * 6/2003 Hamano et al. ............. 359/687
7,139,131 B2 * 11/2006 Nanba et al. ................ 359/687

FOREIGN PATENT DOCUMENTS

| JP | 63-266414 A | 11/1988 |
| JP | 8-82743 A | 3/1996 |
| JP | 2002-98895 A | 4/2002 |
| JP | 2004-212512 A | 7/2004 |

* cited by examiner

*Primary Examiner*—Jordan M. Schwartz
(74) *Attorney, Agent, or Firm*—Sidley Austin LLP

(57) ABSTRACT

A variable magnification optical system for forming an optical image of an object on a light-receiving surface of an image sensor with variable magnification includes: from the object side, at least a first lens unit having a positive optical power, a second lens unit having a negative optical power, a third lens unit having a positive optical power, and a fourth lens unit having a positive optical power. In magnification variation from the wide angle end to the telephoto end, at least the first lens unit moves. Conditional formulae (1) and (2) below are fulfilled: (1) $6.0 < f1/fw < 20.0$ and (2) $1.83 < Nd_{ave}$, where f1 represents the focal length of the first lens unit, fw represents the focal length of the entire system at the wide angle end, and $Nd_{ave}$ represents the average refractive index for a d-line among all lens elements included in the second lens unit.

8 Claims, 11 Drawing Sheets

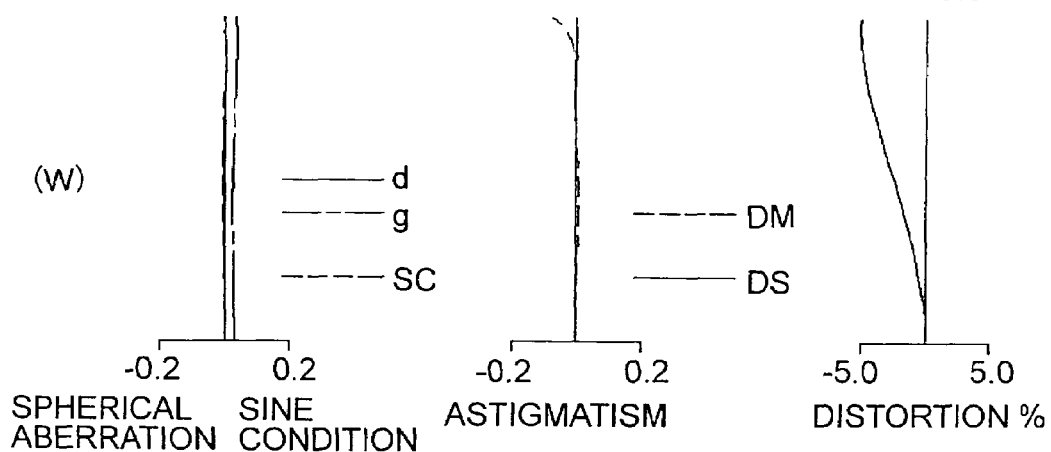
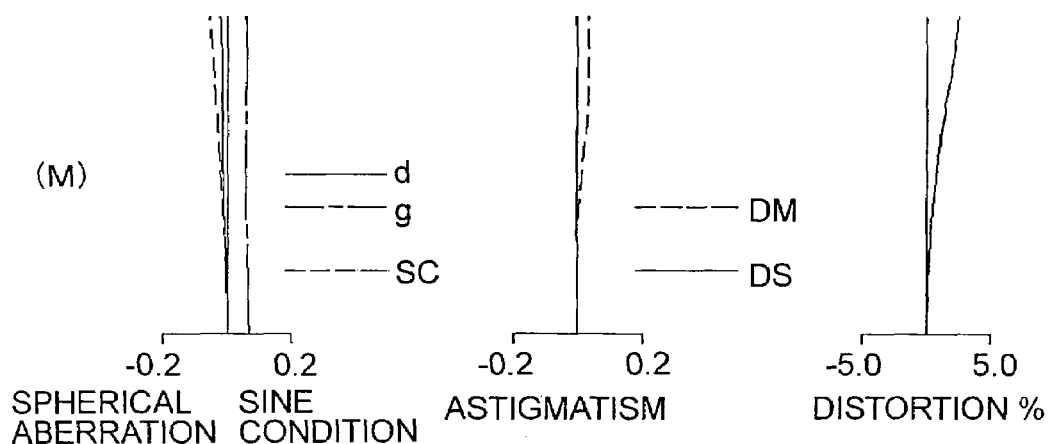
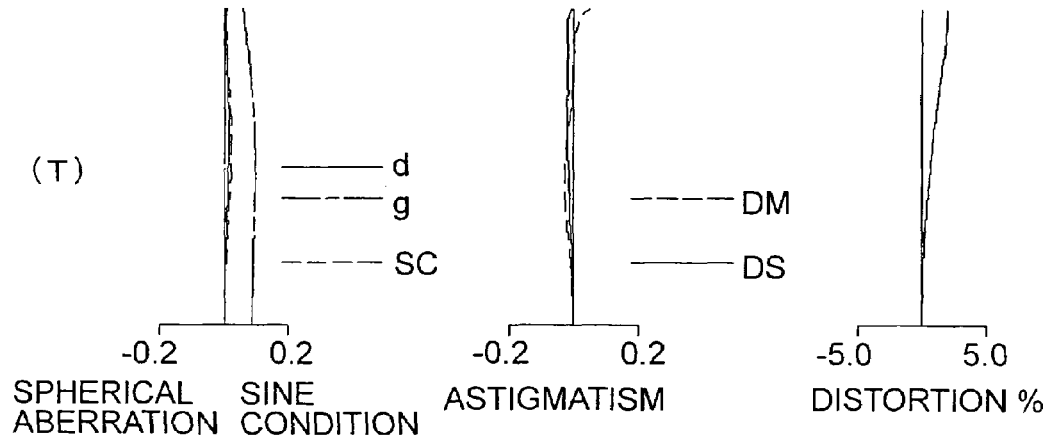

FNO=2.88

(W)

— d
— — g
- - - SC

-0.2  0.2
SPHERICAL   SINE
ABERRATION  CONDITION

Y'=3.6

- - - DM
— DS

-0.2  0.2
ASTIGMATISM

Y'=3.6

-5.0  5.0
DISTORTION %

FNO=4.00

(M)

— d
— — g
- - - SC

-0.2  0.2
SPHERICAL   SINE
ABERRATION  CONDITION

Y'=3.6

- - - DM
— DS

-0.2  0.2
ASTIGMATISM

Y'=3.6

-5.0  5.0
DISTORTION %

FNO=4.60

(T)

— d
— — g
- - - SC

-0.2  0.2
SPHERICAL   SINE
ABERRATION  CONDITION

Y'=3.6

- - - DM
— DS

-0.2  0.2
ASTIGMATISM

Y'=3.6

-5.0  5.0
DISTORTION %

FNO=2.88

(W)

d
g
SC

SPHERICAL ABERRATION SINE CONDITION

Y'=3.6

DM
DS

ASTIGMATISM

Y'=3.6

DISTORTION %

FNO=4.00

(M)

d
g
SC

SPHERICAL ABERRATION SINE CONDITION

Y'=3.6

DM
DS

ASTIGMATISM

Y'=3.6

DISTORTION %

FNO=4.60

(T)

d
g
SC

SPHERICAL ABERRATION SINE CONDITION

Y'=3.6

DM
DS

ASTIGMATISM

Y'=3.6

DISTORTION %

FIG.9A
FNO=2.88
FIG.9B
Y'=3.6
FIG.9C
Y'=3.6
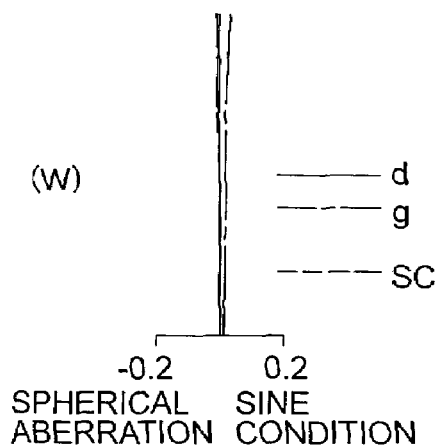
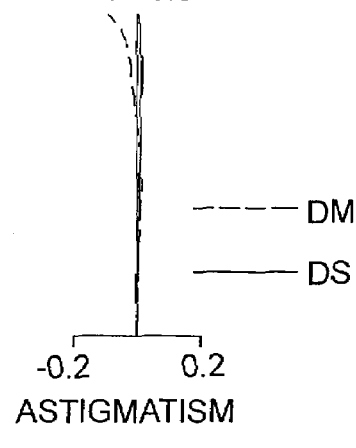
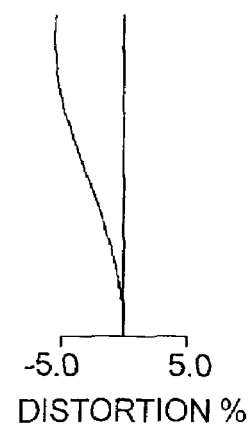
(W)
— d
— — g
— — — SC
— — — DM
——— DS
-0.2   0.2
SPHERICAL   SINE
ABERRATION  CONDITION
-0.2   0.2
ASTIGMATISM
-5.0   5.0
DISTORTION %
FIG.9D
FNO=4.00
FIG.9E
Y'=3.6
FIG.9F
Y'=3.6
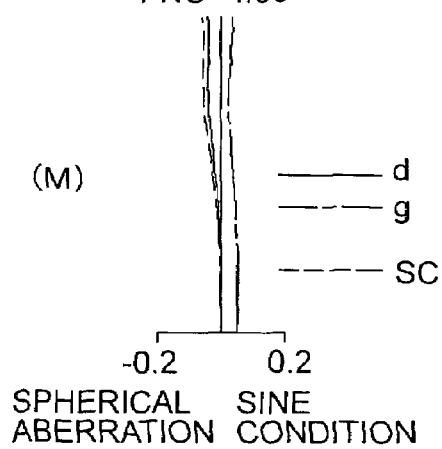
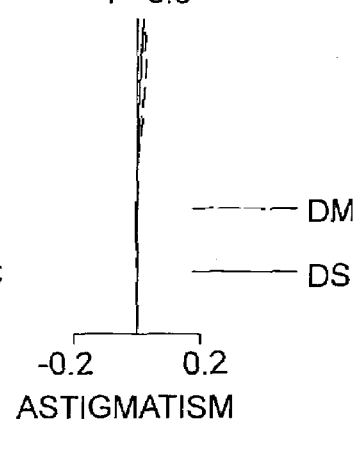
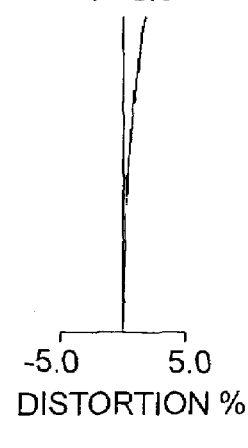
(M)
— d
— — g
— — — SC
— — — DM
——— DS
-0.2   0.2
SPHERICAL   SINE
ABERRATION  CONDITION
-0.2   0.2
ASTIGMATISM
-5.0   5.0
DISTORTION %
FIG.9G
FNO=4.60
FIG.9H
Y'=3.6
FIG.9I
Y'=3.6
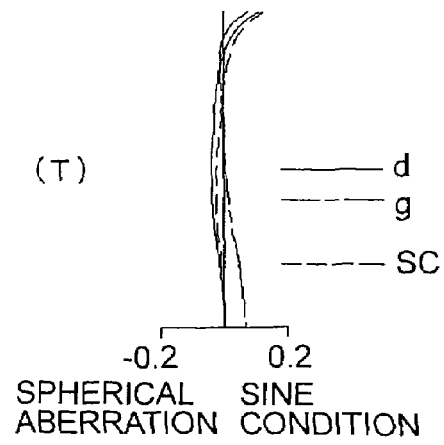
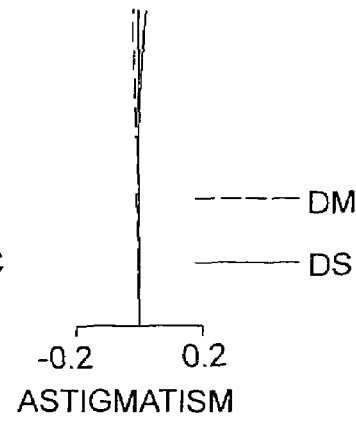
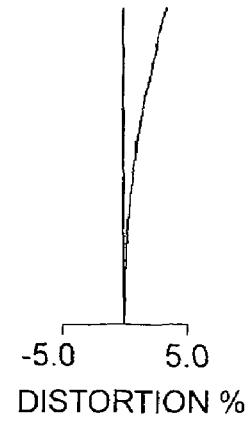
(T)
— d
— — g
— — — SC
— — — DM
——— DS
-0.2   0.2
SPHERICAL   SINE
ABERRATION  CONDITION
-0.2   0.2
ASTIGMATISM
-5.0   5.0
DISTORTION %

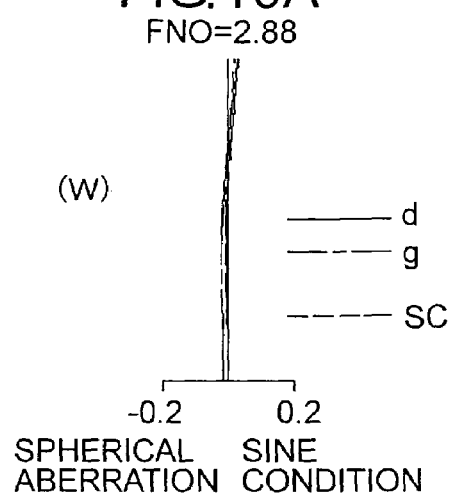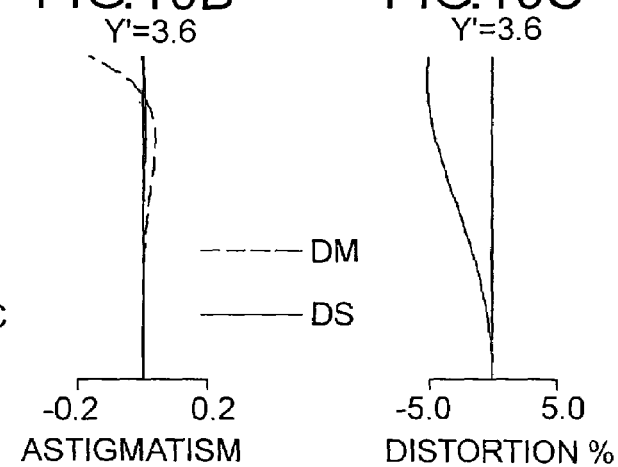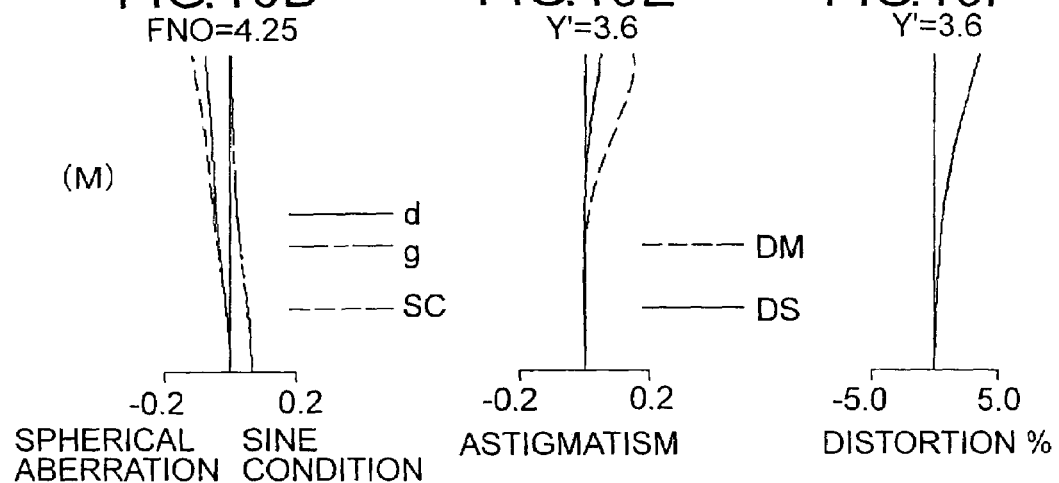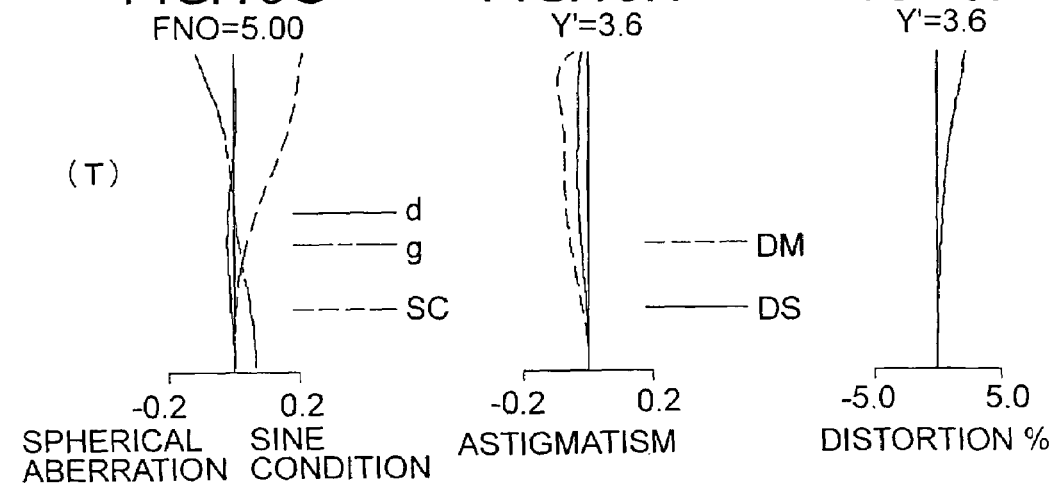

VARIABLE MAGNIFICATION OPTICAL SYSTEM

This application is based on Japanese Patent Application No. 2005-187555 filed on Jun. 28, 2005, the contents of which are hereby incorporated by reference.

BACKGROUND OF THE INVENTION

1. Field of the Invention

The present invention relates to a variable magnification optical system. More particularly, the present invention relates to a variable magnification optical system suitable for, for example, a digital camera or a digital appliance equipped with an image capturing capability that capture an image of a subject with an image sensor, especially a compact zoom lens system that provides a wide angle and a high magnification variation ratio, and to an image-taking apparatus provided therewith.

2. Description of Related Art

In recent years, as personal computers become increasingly widespread, digital cameras which permits easy acquisition of images have been becoming more and more popular. Consequently, there has been a demand for a more compact digital camera and also a demand for an even more compact photographing lens system. Meanwhile, as the number of pixels used in an image sensor tends to increase year by year, there is a demand for an image-taking lens system that can provide a high optical performance to keep up with the increase in the number of pixels used in the image sensor and that is easy to fabricate to keep up with a shortening product cycle. Zooming at a magnification variation ratio as high as over ×7 or ×10 has become a common practice, which brings about an expectation for an even higher magnification variation ratio while an expectation for a wider angle also arises. To satisfy such demands, various types of zoom lens systems have been conventionally proposed (see patent documents 1 to 4, for example).

[Patent document 1] Japanese Patent Application Laid-open No. S63-266414

[Patent document 2] Japanese Patent Application Laid-open No. H8-82743

[Patent document 3] Japanese Patent Application Laid-open No. 2002-98895

[Patent document 4] Japanese Patent Application Laid-open No. 2004-212512

However, the conventional zoom lens systems proposed suffer from difficulties in simultaneously satisfying such mutually contradictory demands for a higher magnification variation ratio, a more compact size, a higher performance, and for a wider angle. The zoom lens system proposed in patent document 1 has a magnification variation ratio of about ×10, which is hardly considered to be achieving a high magnification variation ratio. The zoom lens system proposed in patent document 2 has a magnification variation ratio as high as ×20, but has a field angle of 70 degrees or less, which is hardly considered to be achieving a wide angle. The zoom lens systems proposed in patent documents 3 and 4 are also hardly considered to be achieving satisfactory balance among a magnification variation ratio, an optical performance, a lens full length, and the like.

SUMMARY OF THE INVENTION

In view of such a condition, the present invention has been made, and it is an object of the present invention to provide an variable magnification optical system that is compact in size and can provide a high performance while achieving a wide angle and an ultrahigh magnification variation ratio, and also to provide an image-taking apparatus provided therewith.

To achieve the object described above, according to one aspect of the present invention, a variable magnification optical system for forming an optical image of an object on a light-receiving surface of an image sensor with variable magnification includes: from the object side, at least a first lens unit having a positive optical power, a second lens unit having a negative optical power, a third lens unit having a positive optical power, and a fourth lens unit having a positive optical power. In magnification variation from the wide angle end to the telephoto end, at least the first lens unit moves. Conditional formulae (1) and (2) below are fulfilled: $6.0 < f1/fw < 20.0$ ... (1) and $1.83 < Nd_{ave}$ ... (2), where f1 represents the focal length of the first lens unit, fw represents the focal length of the entire system at the wide angle end, and $Nd_{ave}$ represents the average refractive index for a d-line among all lens elements included inn the second lens unit.

According to another aspect of the invention, an image taking apparatus includes a variable magnification optical system for forming an optical image of an object with variable magnification, and an image sensor for converting the optical image into an electrical signal. In the variable magnification optical system includes: from the object side, at least a first lens unit having a positive optical power, a second lens unit having a negative optical power, a third lens unit having a positive optical power, and a fourth lens unit having a positive optical power. In magnification variation from the wide angle end to the telephoto end, at least the first lens unit moves. Conditional formulae (1) and (2) below are fulfilled: $6.0 < f1/fw < 20.0$ ... (1) and $1.83 < Nd_{ave}$ ... (2), where f1 represents the focal length of the first lens unit, fw represents the focal length of the entire system at the wide angle end, and $Nd_{ave}$ represents the average refractive index for a d-ling among all lens elements included in the second lens unit.

According to the present invention, in a variable magnification optical system with a four lens units including: from an object side, a positive, a negative, a positive, a positive lens units, the optical power of the first lens unit and the average refractive index of the second lens unit, and the like satisfies predetermined conditions. This permits achieving a wider angle and an ultrahigh magnification variation ratio while achieving a more compact size and a higher performance. The use of the image taking apparatus according to the present invention for a device, such as digital camera or the like can contribute to slimming down, weight saving, downsizing, cost reduction, performance enhancement, function enhancement, and the like of this device.

BRIEF DESCRIPTION OF THE DRAWINGS

FIG. 6A to 6I are aberration diagrams of Example 1;

FIG. 9A to 9I are aberration diagrams of Example 4;

FIG. 10A to 10I are aberration diagrams of Example 5; and

DETAILED DESCRIPTION OF PREFERRED EMBODIMENTS

Hereinafter, a variable magnification optical system, an image-taking apparatus, and the like embodying the present invention will be described with reference to the drawings. The image-taking apparatus according to the present invention is an optical apparatus that optically takes in an image of a subject and then outputs it in the form of an electrical signal. Such an image-taking apparatus is used as a main component of a camera that is used to photograph a still or moving picture of a subject. Examples of such cameras include digital cameras, video cameras, surveillance cameras, car-mounted cameras, cameras for videophones, cameras for intercoms, and cameras incorporated in or externally fitted to personal computers, portable information appliances (compact, portable information terminal, such as mobile computers, cellular phones, personal digital assistants (PDAs)), peripheral devices therefor (such as mouses, scanners, printers, memories), other digital appliances, and the like. As these examples show, by the use of an image-taking apparatus, it is possible not only to build a camera but also to incorporate an image-taking apparatus in various devices to provide them with a camera capability. For example, it is possible to realize a digital appliance provided with an image input capability, such as a cellular phone furnished with a camera.

The term "digital camera" in its conventional sense denotes one that exclusively records optical still pictures, but, now that digital still cameras and home-use digital movie cameras that can handle both still and moving pictures have been proposed, the term has come to be used to denote either type. Accordingly, in the present specification, the term "digital camera" denotes any camera that includes as its main component an image-taking apparatus provided with an image-taking lens system for forming an optical image, an image sensor for converting the optical image into an electrical signal, and other components, examples of such cameras including digital still cameras, digital movie cameras, and Web cameras (i.e., cameras that are connected, either publicly or privately, to a device connected to a network to permit transmission and reception of images, including both those connected directly to a network and those connected to a network by way of a device, such as a personal computer, having an information processing capability).

Figure 1:
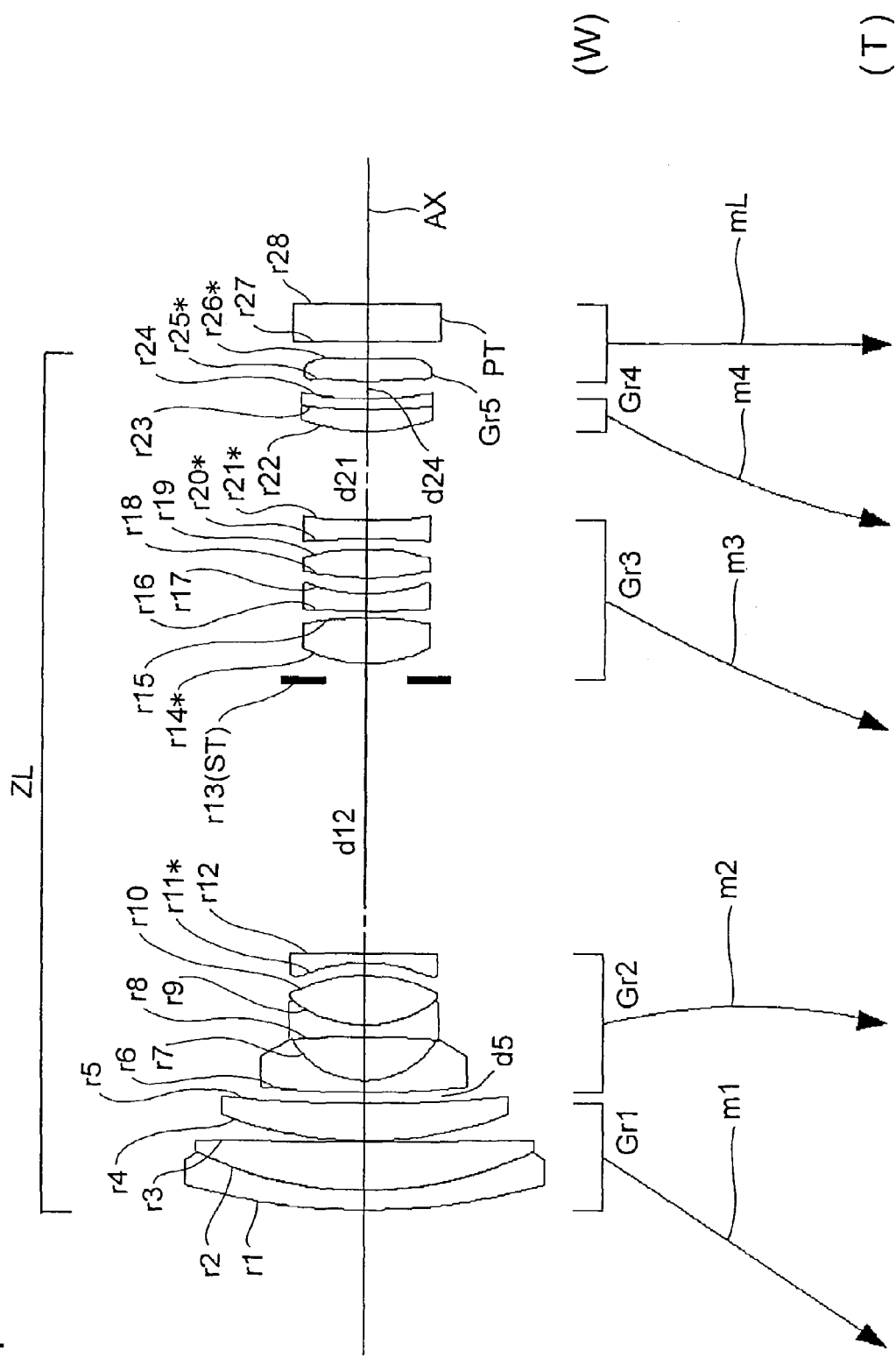
FIG. 1 is a lens construction diagram of a first embodiment (Example 1) according to the present invention.
Figure 2:
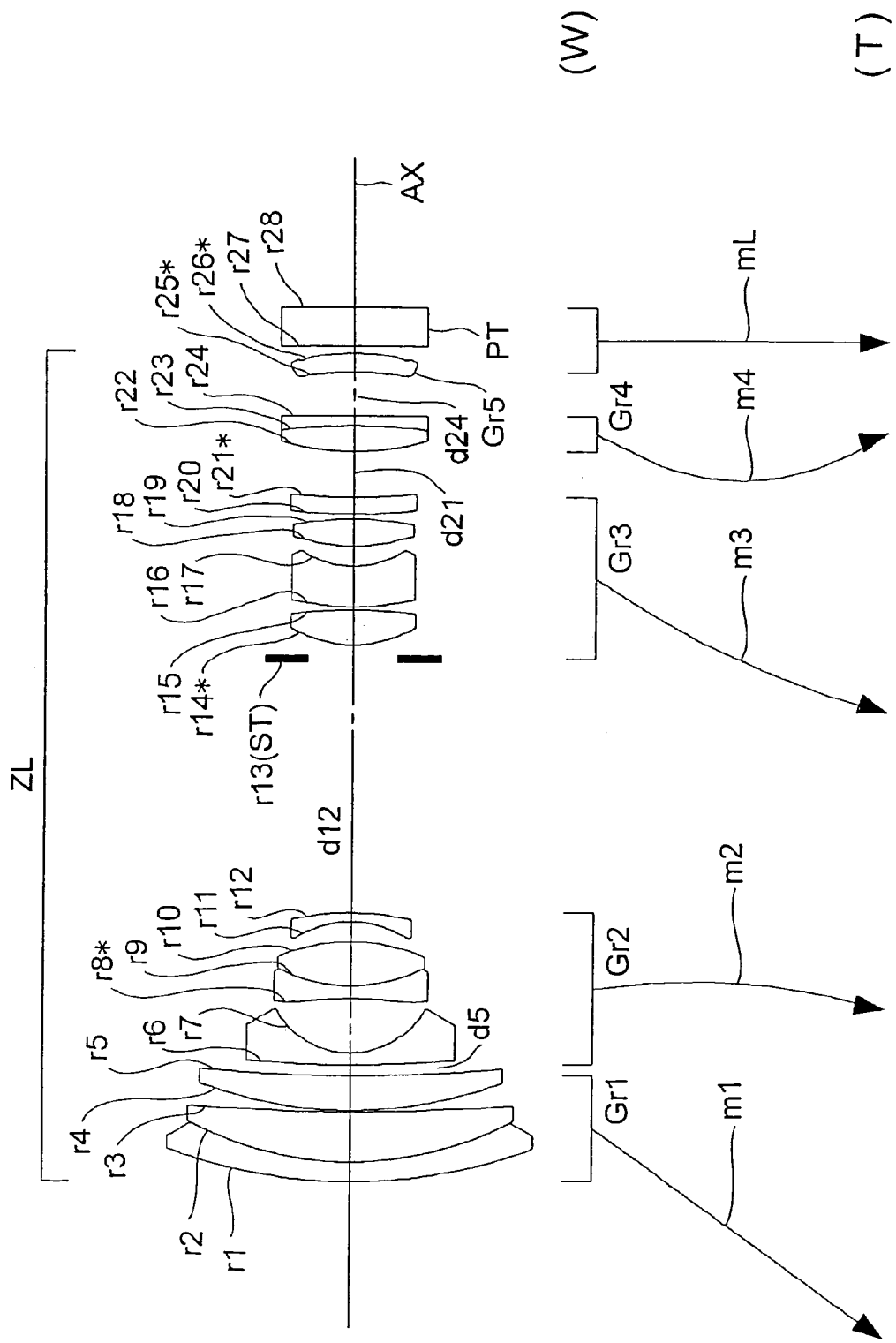
FIG. 2 is a lens construction diagram of a second embodiment (Example 2) according to the invention.
Figure 3:
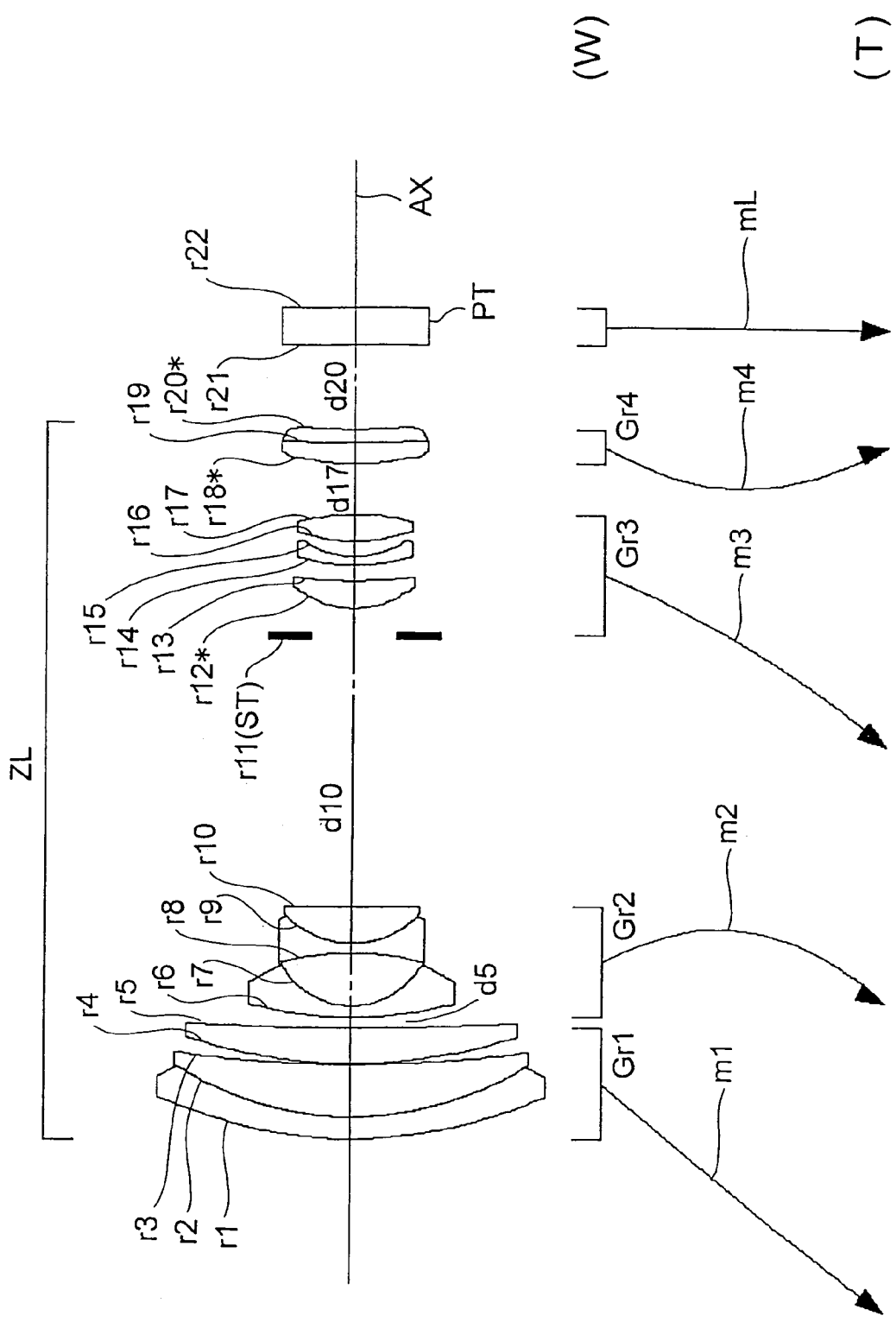
FIG. 3 is a lens construction diagram of a third embodiment (Example 3) according to the invention.
Figure 4:
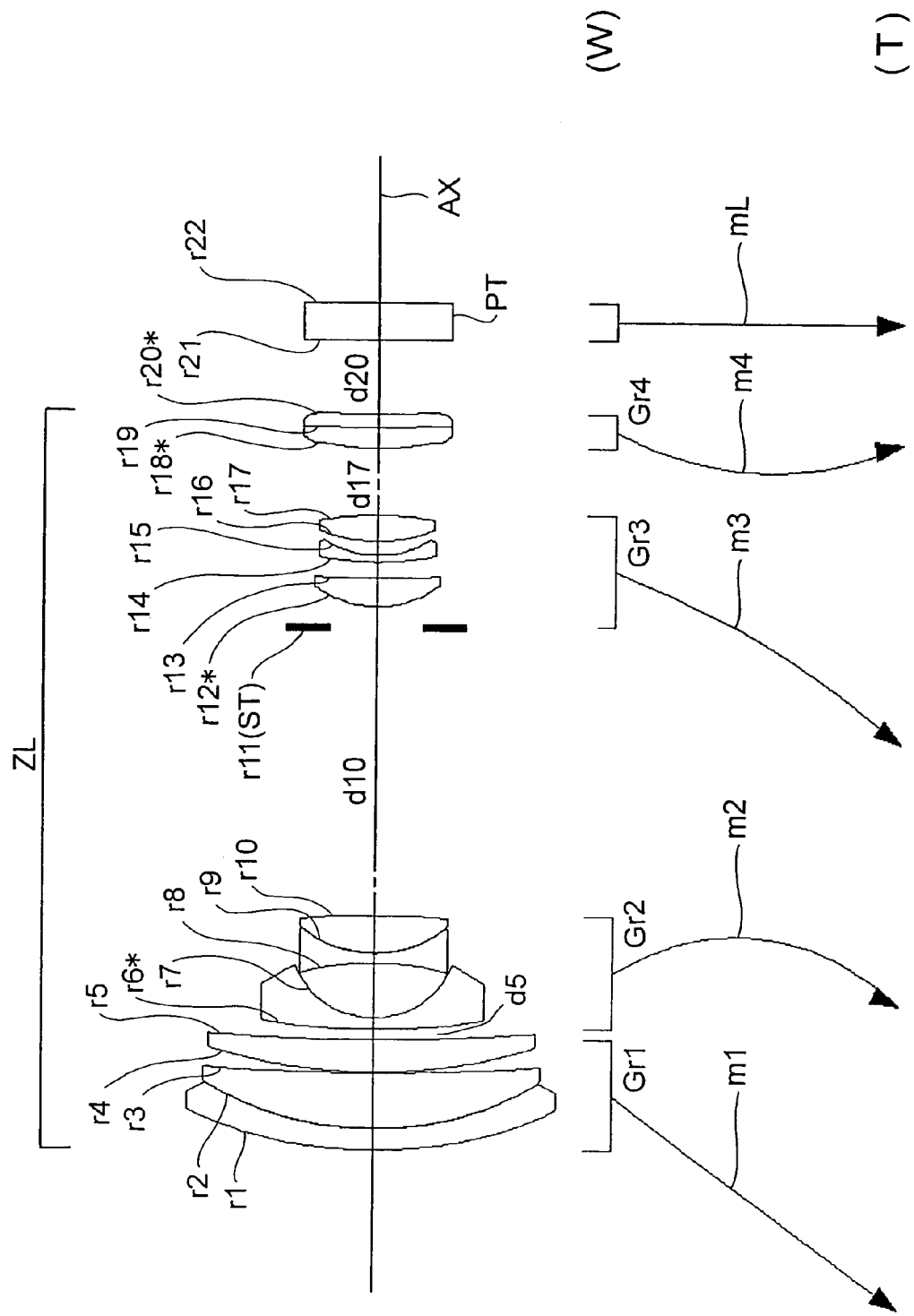
FIG. 4 is a lens construction diagram of a fourth embodiment (Example 4) according to the invention.
Figure 5:
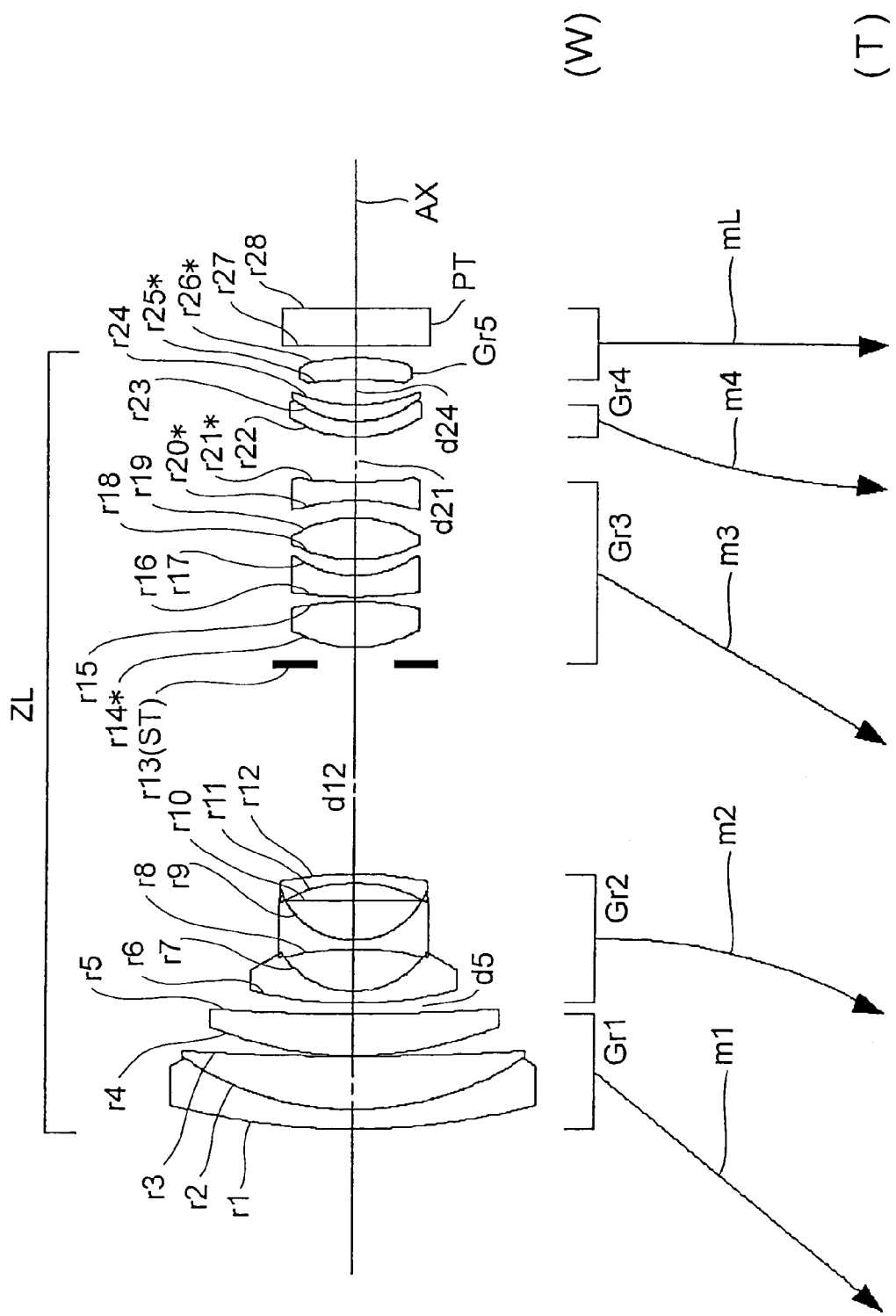
FIG. 5 is a lens construction diagram of a fifth embodiment (Example 5) according to the invention.
Figure 7A:
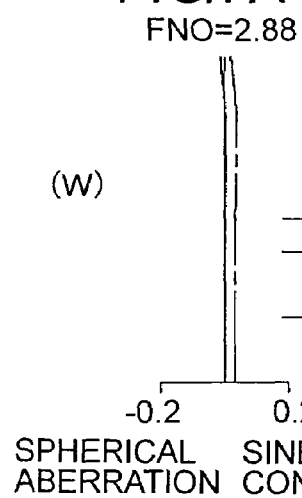
FIG. 7A to 7I are aberration diagrams of Example 2.
Figure 7B:
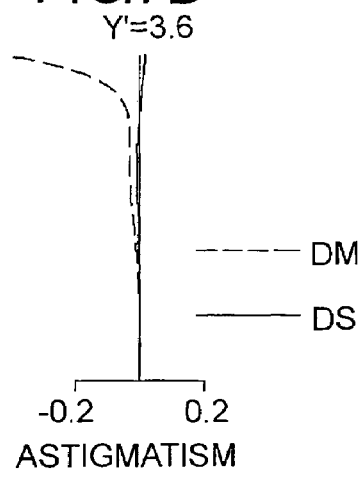
Figure 7C:
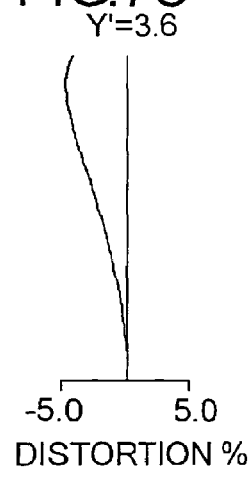
Figure 7D:
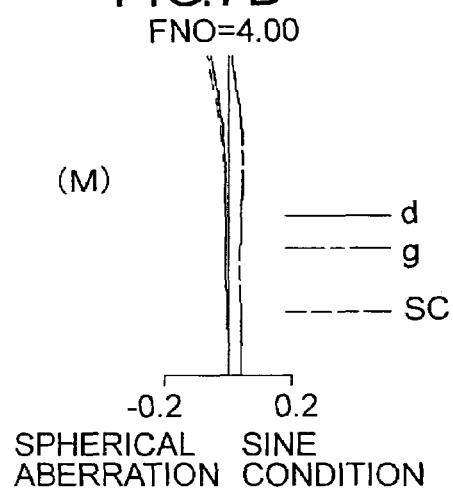
Figure 7E:
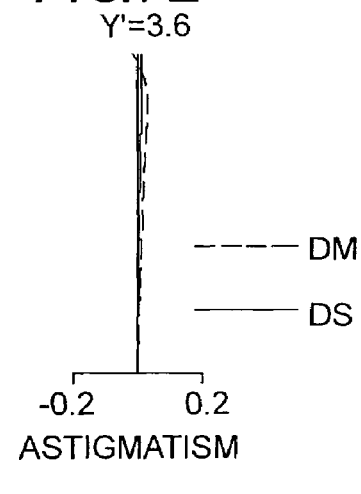
Figure 7F:
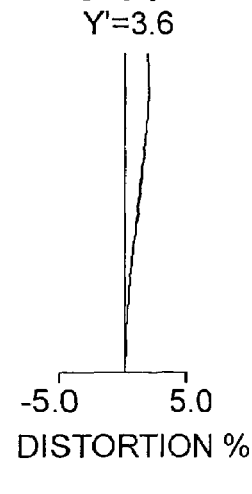
Figure 7G:
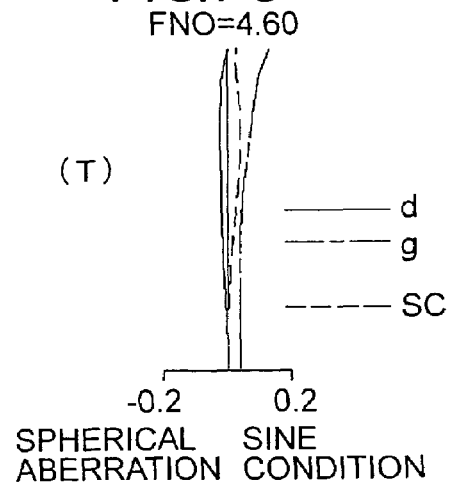
Figure 7H:
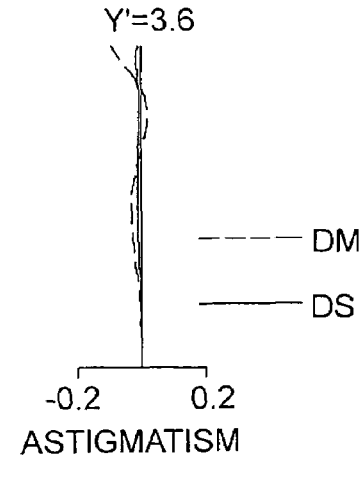
Figure 7I:
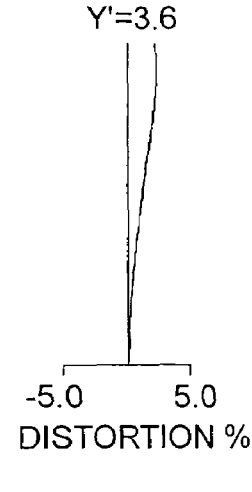
Figure 8A:
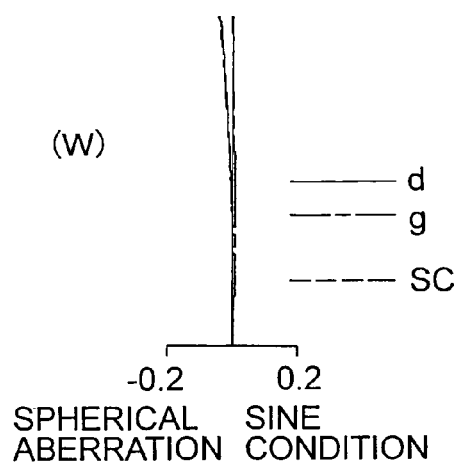
FIG. 8A to 8I are aberration diagrams of Example 3
Figure 8B:
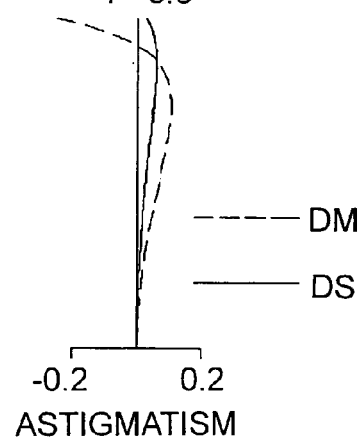
Figure 8C:
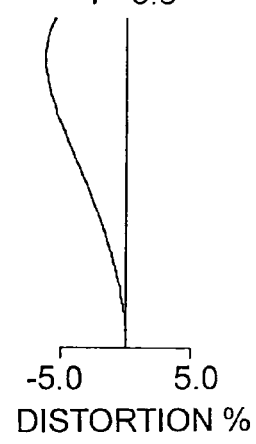
Figure 8D:
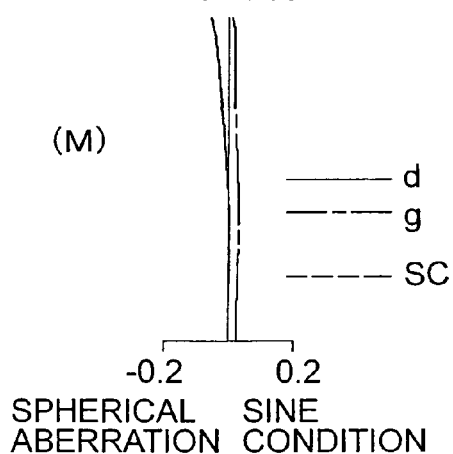
Figure 8E:
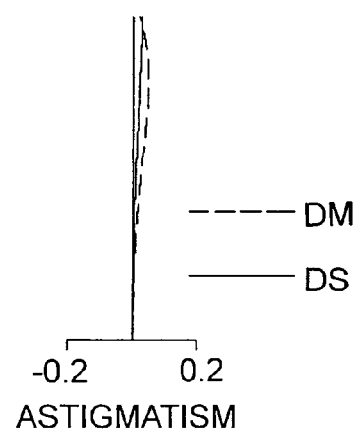
Figure 8F:
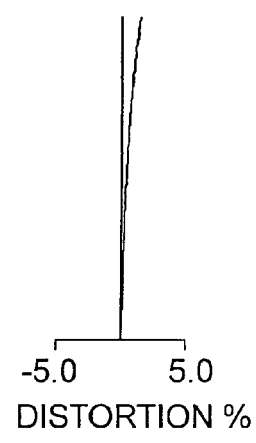
Figure 8G:
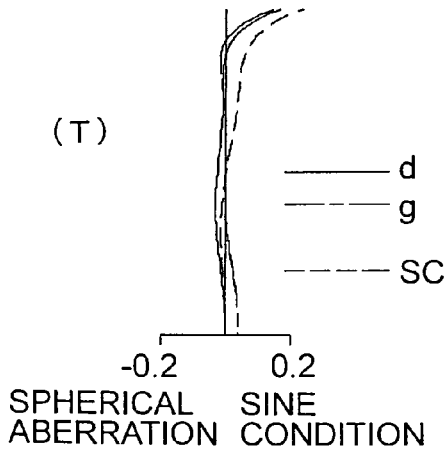
Figure 8H:
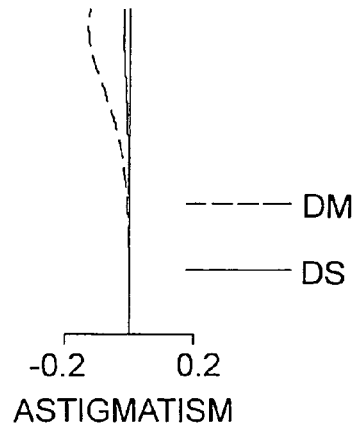
Figure 8I:
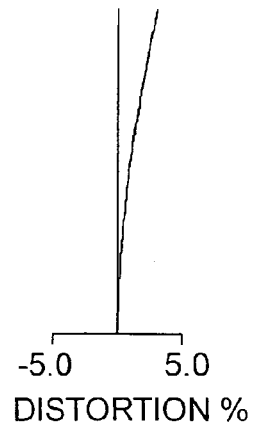
Figure 11:
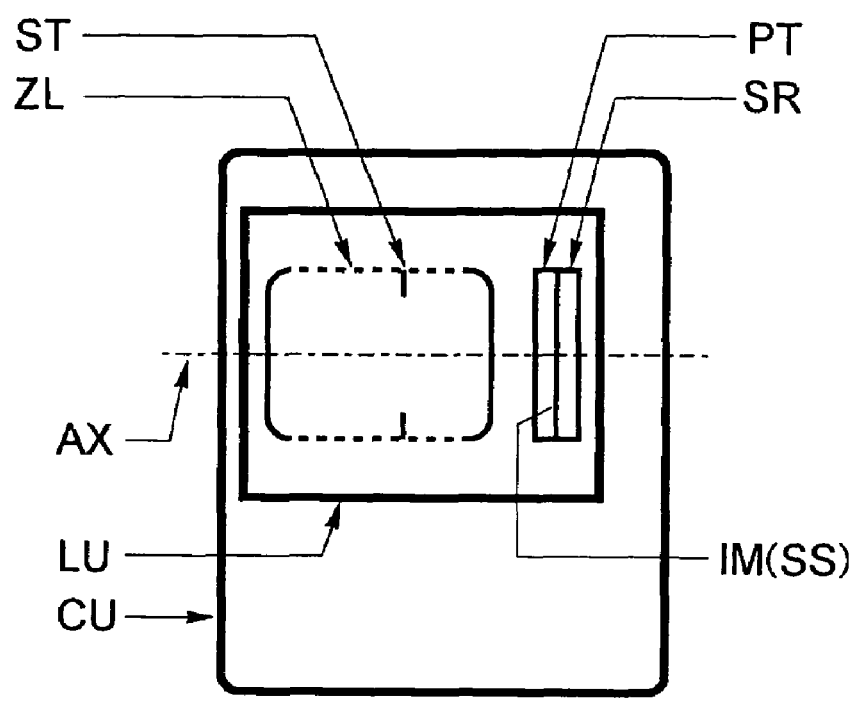
FIG. 11 is a pattern diagram showing an example of the schematic optical construction of a camera equipped with an image-taking apparatus according to the invention.

FIG. 11 shows an example of the schematic optical construction of a camera CU (corresponding to a digital camera, a digital appliance provided with an image input capability, or the like) with a schematic cross section. An image-taking apparatus LU mounted in the camera CU includes: from the object (i.e., subject) side thereof, a zoom lens system ZL (corresponding to a variable magnification optical system as an image-taking lens system, with ST representing an aperture stop) for forming an optical image (image surface IM) of an object with variable magnification; a parallel-plane plate PT (corresponding to an optical filter such as an optical low-pass filter or infrared cut filter arranged as required, the cover glass of an image sensor SR, or the like); and an image sensor SR for converting the optical image IM formed on the light-receiving surface SS thereof by the zoom lens system ZL into an electrical signal. The image-taking apparatus LU is used as a component of the camera CU corresponding to a digital camera, or the like. When this image-taking apparatus LU is incorporated in a digital camera, the image-taking apparatus LU is usually arranged inside the body of the camera. Here, the camera capability can be realized in a desired manner that suits particular needs. For example, the image-taking apparatus LU may be built as a unit that is freely detachable from or freely rotatable relative to the body of the camera; or the image-taking apparatus LU may be built as a unit that is freely detachable from or freely rotatable relative to a portable information appliance (such as a cellular phone or PDA).

The zoom lens system ZL includes a plurality of lens units so that the plurality of lens units move along the optical axis AX and interval between lens units is varied to achieve variable magnification (i.e. zooming). The first, second, and fifth embodiments of the zoom lens system ZL as described below employ 5-unit zoom construction including a positive, a negative, a positive, a positive, and a positive lens units. The third and fourth embodiments of the zoom lens system ZL employ 4-unit zoom construction including a positive, a negative, a positive, and a positive lens units. In any of the embodiments, the first to fourth lens units Gr1 to Gr4 are movable units. In the first, second, and fifth embodiments, the fifth lens unit Gr5 is a fixed unit. The image-taking lens system to be used in the image-taking apparatus LU is not limited to the zoom lens system ZL. Instead of the zoom lens system ZL, other types of variable magnification optical systems (for example, a variable-focal-length imaging optical system such as a varifocal lens system or a lens system that permits switching among a plurality of focal lengths) may be used as an image-taking lens system.

An optical image to be formed by the zoom lens system ZL passes through the optical low-pass filter (corresponding to the parallel-plane plate PT shown in FIG. 11) having a predetermined cutoff frequency characteristic that depends on the pixel pitch of the image sensor SR, and meanwhile the optical image has its spatial frequency characteristic so adjusted as to minimize so-called aliasing noise generated when the optical image is converted into an electric signal. This helps alleviate the generation of color moire. Aiming at moderate performance around the resolution limit frequency makes it possible to disregard the generation of noise without the use of an optical low-pass filter. Moreover, in a case where the user photographs or observes images by the use of a display system (such as the liquid crystal display screen of a cellular phone or the like) on which noise is inconspicuous, there is no need to use an optical low-pass filter in the image-taking lens system.

Used as the optical low-pass filter is a birefringence-type low-pass filter, a phase-type low-pass filter, or the like. Examples of birefringence-type low-pass filters include those made of a birefringent material such as quartz having a crystal axis appropriately aligned in a predetermined direction and those composed of wavelength plates or the like, which change the polarization plane, laid on one another. Examples of phase-type low-pass filters include those that achieve required optical cut-off frequency characteristics by exploiting diffraction.

Used as the image sensor SR is a solid-state image sensor such as a CCD (charge-coupled device) or CMOS (complementary metal oxide semiconductor) sensor having a plurality of pixels. The optical image formed (on the light-receiving surface SS of the image sensor SR) by the zoom lens system ZL is converted into an electrical signal by the image sensor SR. The signal produced by the image sensor SR is subjected to predetermined digital image processing, image compression processing, or the like as required, and is recorded into a memory (such as a semiconductor memory or an optical disk) as a digital video signal; in some cases, the signal is transferred to another appliance through a cable or after being converted into an infrared signal.

In the image-taking apparatus LU shown in FIG. 11, the zoom lens system ZL performs reduced projection from the subject on the enlargement side to the image sensor SR on the reduction side. The use of a display element for displaying a two-dimensional image (for example, liquid crystal display element) instead of the image sensor SR, plus the use of the zoom lens system ZL as a projection lens system, can provide an image projector for performing enlarged projection from the image display surface on the reduction side to the screen surface on the enlargement side. That is, the zoom lens system ZL of the embodiments as described below is not limited for use as an image-taking lens system, but favorably usable as a projection lens system.

FIGS. 1 to 5 are lens construction diagrams respectively corresponding to the zoom lens systems ZL used in the first to fifth embodiments, each showing the lens arrangement as observed at the wide-angle end W in an optical section. In each of the lens construction diagrams, the following conventions are used. A surface indicated by ri (i=1, 2, 3, . . . ) is the i-th surface counted from the object side, and a surface whose symbol ri is marked with an asterisk (*) is an aspherical surface. An axial distance indicated by di (i=1, 2, 3, . . . ) is the i-th axial distance counted from the object side, though only those axial distances which vary during zooming are shown here. In each of the lens construction diagrams, arrows m1, m2, m3, and m4 represent movement loci that schematically indicate the movement of the first to fourth lens units Gr1 to GR4, respectively, during zooming from the wide-angle end W to the telephoto end T. The arrow mL shown on the most image side indicates that the plane-parallel plate PT and also the fifth lens unit Gr5 (in the first, second, and fifth embodiments) are fixed in position during zooming. In any of the embodiments, the third lens unit Gr3 has on the most object side the aperture stop ST, which serves as a component of the third lens unit Gr3 and moves (in the direction indicated by the arrow m3) during zooming.

The zoom lens systems ZL of the first, second, and fifth embodiments are each composed of, from the object side: a first lens unit Gr1 having a positive optical power (the optical power is a quantity by the reciprocal of the focal length), a second lens unit Gr2 having a negative optical power, a third lens unit Gr3 having a positive optical power, a fourth lens unit Gr4 having a positive optical power, and a fifth lens unit Gr5 having a positive optical power. This zoom lens system ZL is provided with a five-unit zoom construction that permits zooming by varying intervals between lens units. The zoom lens systems ZL of the third and fourth embodiments are each composed of, from the object side: a first lens unit Gr1 having a positive optical power, a second lens unit Gr2 having a negative optical power, a third lens unit Gr3 having a positive optical power, and a fourth lens unit Gr4 having a positive optical power. This zoom lens system ZL is provided with a four-unit zoom construction that permits zooming by varying intervals between lens units. The lens construction of each embodiment will be described below.

In the first embodiment (FIG. 1), in the five-unit zoom construction composed of a positive, a negative, a positive, a positive, and a positive lens units, each lens unit is built as follows. The first lens unit Gr1 is composed of: from the object side, a cemented lens element formed of a negative meniscus lens element concave to the image side and a positive meniscus lens element convex to the object side; and a positive meniscus lens element convex to the object side. The second lens unit Gr2 is composed of: from the object side, a negative meniscus lens element concave to the image side; a cemented lens element formed of a biconcave negative lens element and a biconvex positive lens element; and a biconcave negative lens element having an aspherical surface on the object side. The third lens unit Gr3 is composed of: from the object side, the aperture ST; a biconvex positive lens element having an aspherical surface on the object side; a negative meniscus lens element concave to the image side; a biconvex positive lens element; and a biconcave negative lens element having aspherical surfaces on both sides. The fourth lens unit Gr4 is composed of only one cemented lens element formed of a positive meniscus lens element convex to the object side and a negative meniscus lens element concave to the image side. The fifth lens unit Gr5 is composed of only one biconvex positive lens element having aspherical surfaces on both sides. During zooming from the wide-angle end (W) to the telephoto end (T), the first lens unit Gr1 monotonously moves toward the object side, the second lens unit Gr2 moves toward the image side and then moves from the image side back toward the object side, the third lens unit Gr3 moves toward the object side while gradually reducing the speed thereof, and the fourth lens unit Gr4 moves toward the object side while gradually reducing the speed thereof Meanwhile, and the fifth unit Gr5 and the parallel-plane plate PT are kept in fixed zoom position with respect to the image surface IM.

In the second embodiment (FIG. 2), in the five-unit zoom construction composed of a positive, a negative, a positive, a positive, and a positive lens units, each lens unit is built as follows. The first lens unit Gr1 is composed of: from the object side, a cemented lens element formed of a negative meniscus lens element concave to the image side and a positive meniscus lens element convex to the object side; and a positive meniscus lens element convex to the object side. The second lens unit Gr2 is composed of: from the object side, a negative meniscus lens element concave to the image side; a cemented lens element formed of a biconcave negative lens element having an aspherical surface on the object side and a biconvex positive lens element; and a negative meniscus lens element concave to the object side. The third lens unit Gr3 is composed of: from the object side, the aperture ST; a biconvex positive lens element having an aspherical surface on the object side; a negative meniscus lens element concave to the image side; a biconvex positive lens element; and a negative meniscus lens element concave to the image side and having an aspherical surface on the image side. The fourth lens unit Gr4 is composed of only one cemented lens element formed of a biconvex positive lens element and a biconcave negative lens element. The fifth lens unit Gr5 is composed of only one positive meniscus lens element convex to the image side and having aspherical surfaces on both sides. During zooming from the wide-angle end (W) to the telephoto end (T), the first lens unit Gr1 monotonously moves toward the object side, the second lens unit Gr2 moves toward the image side and then moves from the image side back toward the object side, the third lens unit Gr3 moves toward the object side while gradually reducing the speed thereof, and the fourth lens unit Gr4 moves toward the object side and then moves from the object side back toward the image side. Meanwhile, the fifth unit Gr5 and the parallel-plane plate PT are kept in fixed zoom position with respect to the image surface IM.

In the third embodiment (FIG. 3), in the four-unit zoom construction composed of a positive, a negative, a positive, and a positive lens units, each lens unit is built as follows. The first lens unit Gr1 is composed of: from the object side, a cemented lens element formed of a negative meniscus lens element concave to the image side and a positive meniscus lens element convex to the object side; and a positive meniscus lens element convex to the object side. The second lens unit Gr2 is composed of: from the object side, a negative meniscus lens element concave to the image side; and a cemented lens element formed of a biconcave negative lens element and a positive meniscus lens element convex to the object side. The third lens unit Gr3 is composed of: from the object side, the aperture ST; a positive meniscus lens element convex to the object side and having an aspherical surface on the object side; a negative meniscus lens element concave to the image side; and a biconvex positive lens element. The fourth lens unit Gr4 is composed of only one cemented lens element formed of a positive meniscus lens element convex to the object side and having an aspherical surface on the object side and a negative meniscus lens element concave to the image side and having an aspherical surface on the image side. During zooming from the wide-angle end (W) to the telephoto end (T), the first lens unit Gr1 monotonously moves toward the object side, the second lens unit Gr2 moves toward the image side and then moves from the image side back toward the object side, the third lens unit Gr3 moves toward the object side while gradually increasing the speed thereof, and the fourth lens unit Gr4 moves toward the object side and then moves from the object side back toward the image side. Meanwhile, the parallel-plane plate PT is kept in fixed zoom position with respect to the image surface IM.

In the fourth embodiment (FIG. 4), in the four-unit zoom construction composed of a positive, a negative, a positive, and a positive lens units, each lens unit is built as follows. The first lens unit Gr1 is composed of: from the object side, a cemented lens element formed of a negative meniscus lens element concave to the image side and a positive meniscus lens element convex to the object side; and a positive meniscus lens element convex to the object side. The second lens unit Gr2 is composed of: from the object side, a negative meniscus lens element concave to the image side and having an aspherical surface on the object side; and a cemented lens element formed of a biconcave negative lens element and a biconvex positive lens element. The third lens unit Gr3 is composed of: from the object side, the aperture ST; a positive meniscus lens element convex to the object side and having an aspherical surface on the object side; a negative meniscus lens element concave to the image side; and a biconvex positive lens element. The fourth lens unit Gr4 is composed of only one cemented lens element formed of a positive meniscus lens element convex to the object side and having an aspherical surface on the object side and a negative meniscus lens element concave to the image side and having an aspherical surface on the image side. During zooming from the wide-angle end (W) to the telephoto end (T), the first lens unit Gr1 monotonously moves toward the object side, the second lens unit Gr2 moves toward the image side and then moves from the image side back toward the object side, the third lens unit Gr3 moves toward the object side while gradually increasing the speed thereof, and the fourth lens unit Gr4 moves toward the object side and then moves from the object side back toward the image side.

Meanwhile, the parallel-plane plate PT is kept in fixed zoom position with respect to the image surface IM.

In the fifth embodiment (FIG. 5), in the five-unit zoom construction composed of a positive, a negative, a positive, a positive, and a positive lens units, each lens unit is built as follows. The first lens unit Gr1 is composed of: from the object side, a cemented lens element formed of a negative meniscus lens element concave to the image side and a positive meniscus lens element convex to the object side; and a positive meniscus lens element convex to the object side. The second lens unit Gr2 is composed of: from the object side, a negative meniscus lens element concave to the image side; a cemented lens element formed of a biconcave negative lens element and a biconvex positive lens element; and a negative meniscus lens element concave to the object side. The third lens unit Gr3 is composed of: from the object side, the aperture ST; a biconvex positive lens element having an aspherical surface on the object side; a negative meniscus lens element concave to the image side; a biconvex positive lens element; and a biconcave negative lens element having aspherical surfaces on both sides. The fourth lens unit Gr4 is composed of only one cemented lens element formed of a negative meniscus lens element concave to the image side and a positive meniscus lens element convex to the object side. The fifth lens unit Gr5 is composed of only one positive meniscus lens element convex to the image side and having aspherical surfaces on both sides. During zooming from the wide-angle end (W) to the telephoto end (T), the first lens unit Gr1 monotonously moves toward the object side, the second lens unit Gr2 moves toward the object side while gradually increasing the speed thereof, the third lens unit Gr3 monotonously moves toward the object side, and the fourth lens unit Gr4 moves toward the object side while gradually reducing the speed thereof. Meanwhile, the fifth lens unit Gr5 and the parallel-plane plate PT are kept in fixed zoom position with respect to the image surface IM.

As described above, any of the embodiments employs construction composed of at least four lens units including, from the object side, a positive, a negative, a positive, and a positive lens units. Constructing a variable magnification optical system of such a type so that, in variable magnification from the wide angle end to the telephoto end, at least the first lens unit moves and so that the optical power of the first lens unit, the average refractive index of the second lens unit, and the like satisfy respective predetermined conditions permits achieving a wider angle and an ultrahigh magnification variation ratio while achieving a more compact size and a higher performance. The use of an image-taking apparatus provided with such a variable magnification optical system in apparatuses such as a digital camera, therefore, contributes to achieving slimming-down, weight saving, downsizing, cost reduction, performance enhancement, function enhancement, and the like of these devices. The conditions to obtain these effects in a well-balanced manner and to achieve an even higher optical performance, and the like will be described below.

It is preferable that conditional formulae (1) and (2) below be fulfilled.

$$6.0 < f1/fw < 20.0 \tag{1}$$

$$1.83 < Nd_{ave} \tag{2}$$

where
  f1 represents the focal length of the first lens unit,
  fw represents the focal length of the entire system at the wide angle end, and Nd$_{ave}$ represents the average refractive index for a d-line among all the lens elements included in the second lens unit.

By fulfilling the conditional formulae (1) and (2), it is possible to achieve further downsizing while ensuring a sufficient optical performance and also achieve a wider angle and a higher magnification variation ratio.

The conditional formula (1) defines, by way of division of the focal length of the first lens unit by the focal length of the entire system at the wide angle end, a preferable conditional range in regard to the optical power of the first lens unit. If the lower limit of this conditional formula (1) is disregarded, the positive optical power of the first lens unit increases, which is advantageous in the downsizing of the front lens diameter, but not preferable since the increase in the optical power results in an increase in the occurrence rate of aberration, curvature of field and distortion in particular, which requires addition of a lens element or addition of an aspherical surface to satisfactorily correct the aberration. By contrast, if the upper limit of the conditional formula (1) is disregarded, it becomes advantageous in correcting aberration, but is not preferable since an increase in the front lens diameter and accompanying upsizing are inevitable.

It is further preferable that conditional formula (1a) below be fulfilled.

$$7.0 < f1/fw < 17.0 \tag{1a}$$

This conditional formula (1a) defines, within the conditional range defined by the conditional formula (1), a conditional range further preferable out of the above-stated points and other considerations.

The conditional formula (2) defines a preferable conditional range in regard to the average refractive index among all the lens elements composing the second lens unit. In the variable magnification construction with four lens units including, from the object side, a positive, a negative, a positive, and a positive lens units, aiming at achieving a wider range while achieving a more compact size is likely to cause the optical powers of the first lens unit and the second lens unit to become stronger. With respect to the lens materials for the second lens unit having a negative optical power, those of negative lens elements are typically selected from low-refractive-index, low-dispersion materials, and those for positive lens elements are typically selected from high-refractive-index, high-dispersion materials. Therefore, a stronger optical power of the second lens unit results in a smaller radius of curvature of a negative lens element. The smaller radius of curvature of the negative lens element in the second lens unit then unfavorably results in a higher degree of difficulty in machining this lens element. If conditional formula (2) is fulfilled, the radius of curvature of the negative lens element can be increased, thus easily achieving a compact variable magnification optical system with a wide angle and a high magnification variation ratio.

It is preferable that conditional formulae (2a) below be fulfilled.

$$1.85 < Nd_{ave} \tag{2a}$$

This conditional formula (2a) defines, within the conditional range defined by the conditional formula (2), a conditional range further preferable out of the above-stated points and other considerations.

It is preferable that the second lens unit has at least one negative lens element and at least one positive lens element, and that the aforementioned at least one negative lens element has an aspherical surface. Aiming at achieving a more compact size, a higher magnification variation ratio, and a wider angle results in the optical power of the second lens unit becoming strongly negative, thus causing large negative aberration. The use of an aspherical surface for at least one negative lens element in the second lens unit permits satisfactory aberration correction. In this view, a negative lens element having an aspherical surface is used for the second lens unit Gr2 in the first, second, and fourth embodiments.

It is preferable that the aspherical surface of the negative lens element used for the second lens unit as described above be so formed as to have a weaker negative optical power toward the periphery from the center thereof. Aiming at a more compact size as well as a wider angle results in a stronger optical power of the second lens unit; aberration resulting from this increase in the optical power (negative distortion at the wide angle end in particular) becomes larger. In this condition, it is difficult to correct the aberration. However, arranging the negative lens element having an aspherical surface such that the optical power becomes weaker toward the periphery from the center thereof permits more appropriate aberration correction. In the fourth embodiment, the surface of the negative meniscus lens element on the convex side is aspherical, the (positive) optical power of this surface becomes stronger in the positive direction from the center toward the periphery thereof. In the first and second embodiments, the object side surface of a biconcave lens element is aspherical, the (negative) optical power of this surface becomes weaker from the center toward the periphery thereof. That is, in any of the first, second, and fourth embodiments, the aspherical surface of a negative lens element used for the second lens unit is formed such that the negative optical power of the entire negative lens element becomes weaker.

It is preferable that a negative lens element having a aspherical surface (on at least one of the object side and the image side) in the second lens unit be arranged on the most image side in the second lens unit. Arrangement of the negative lens element having an aspherical surface on the object side in the second lens unit results in a larger lens diameter, thus a higher degree of manufacturing difficulty, which leads to cost increase. In addition, although this arrangement is advantageous in correcting lateral aberration (for example, distortion and curvature of field), it is disadvantageous in correcting longitudinal aberration. As in the first embodiment, the arrangement of a negative lens element having an aspherical surface on the most image side in the second lens unit can solve these problems and provide a high optical performance.

As in the first, second, and fifth embodiments, it is preferable that the second lens unit be composed of at least three negative lens elements and at least one positive lens element. Aiming at an even higher magnification variation ratio and an even wider angle results in a difficulty in correcting chromatic aberration in the second lens unit, lateral chromatic aberration at the wide angle end in particular. Aberration is typically corrected by use of a low dispersion negative lens element. The low dispersion coincides with a low refractive index; therefore, the optical power of the surface is to be strengthened to achieve a more compact size. Strengthening the optical power of the surface leads to a smaller radius of curvature, which results in an unfavorable increase in a degree of machining difficulty. The use of at least three negative lens elements to disperse the negative optical power of the second lens unit permits preventing a decrease in the radius of curvature and also permits appropriate correction of chromatic aberration.

For the optical powers of the third and fourth lens units, it is preferable that conditional formula (3) below be fulfilled.

$$0.05 < f3/f4 < 1.0 \tag{3}$$

where f3 represents the focal length of the third lens unit, and f4 represents the focal length of the fourth lens unit.

The conditional formula (3) defines a preferable conditional range in regard to the optical power ratio of the third and fourth lens units. If the upper limit of this conditional formula (3) is disregarded, the optical power of the fourth lens unit becomes stronger, thus resulting in a greater degree of aberration in the fourth lens unit, which makes it difficult to satisfactorily correct curvature of field from the wide angle end to the telephoto end in particular. Moreover, when focusing is performed by the movement of the fourth lens unit, a fluctuation in aberration due to focusing, a fluctuation in the curvature of field or chromatic aberration in particular, becomes greater. To satisfactorily correct these, addition of a lens element, addition of an aspherical surface, and the like are required. By contrast, if the lower limit of conditional formula (3) is disregarded, this means that the optical power of the third lens unit becomes stronger, or that the optical power of the fourth lens unit becomes weaker. The increase in the optical power of the third lens unit results in an increase in the amount of aberration occurring in the third lens unit, an increase in the amount of spherical aberration in particular. To satisfactorily correct it, addition of a lens element, addition of an aspherical surface, and the like are required, which is not favorable. Moreover, a decrease in the optical power of the fourth lens unit unfavorably leads to the enlargement of the full length and also a too great increase in the amount of movement made by the fourth lens unit when focusing is performed by the movement of the fourth lens unit. In each embodiment, the zoom construction is suitable for focusing performed by the movement of the fourth lens unit; thus, it is preferable that the conditional formula (3) be fulfilled.

It is further preferable that conditional formula (3a) below be fulfilled.

$$0.2 < f3/f4 < 0.8 \tag{3a}$$

This conditional formula (3a) defines, within the conditional range defined by conditional formula (3), a conditional range further preferable out of the above-stated points and other considerations.

The first, second, and fifth embodiments employ a five-unit construction composed of, from the object side, a positive, a negative, a positive, a positive, and a positive lens units, in which the fifth lens unit Gr5 is kept in a fixed position during zooming from the wide angle end W to the telephoto end T. In this way, it is preferable that, in a variable magnification optical system having a five-unit construction include the fifth lens unit that has a positive optical power and that is arranged to the image side of the fourth lens unit, the fifth lens unit be kept in a fixed position in variable magnification from the wide angle end to the telephoto end. It is desirable that the principal ray incident on the image sensor is substantially perpendicular to the light-receiving surface of the image sensor (i.e., telecentric). However, aiming at an even higher magnification and an even more compact size makes it difficult to achieve telecentricity. To provide satisfactory telecentricity, it is preferable to include the fifth lens unit kept in a fixed position during variable magnification. Moreover, the presence of the fifth lens unit kept in a fixed position during variable magnification permits preventing dust contamination which leads to a serious problem occurring in an electronic image sensor.

As in the first, second, and fifth embodiments, it is preferable that the fifth lens unit be composed of one positive lens element. Composing the fifth lens unit with one positive lens element permits preventing the enlargement of the full length and cost increase caused by an increase in the number of lens elements, and also permits providing satisfactory telecentricity. Moreover, it is further preferable to form the fifth lens unit with only one plastic lens element since it can achieve cost reduction and weight saving.

For a magnification variation ratio and an angle of view when the conditional formulae described above are fulfilled (for example, formulae concerning the optical powers of the lens elements, the average refractive index of the second lens unit, and the like), it is preferable that at least one of conditional formulae (4) and (5) below, more preferably both the conditional formulae (4) and (5), be fulfilled to achieve a compact variable magnification optical system, for example, a zoom lens, that provides a high magnification variation ratio while maintaining a high optical performance.

$$ft/fw > 10 \tag{4}$$

$$Y'/fw > 0.735 \tag{5}$$

where ft represents the focal length of the entire system at the telephoto end, fw represents the focal length of the entire system at the wide angle end, and Y' represents the maximum image height.

The conditional formulae (4) and (5) define the magnification variation ratio and the angle of view, respectively, of the variable magnification optical system, to which the conditions and the like described above are suitably applicable. In the variable magnification optical system that fulfills the conditional formulae (4) and (5), the front lens diameter, the full length, the amount of movement of each lens unit, and the like increase inevitably; thus, the effect achieved by the construction that satisfies the conditions and the like described above is exhibited in an outstanding manner. For example, aiming at a high magnification variation ratio such as the one satisfies the conditional formula (4) typically results in difficulties in achieving a more compact size, a higher performance, and a wider angle in the variable magnification optical system. However, a higher magnification variation ratio can be achieved while achieving a more compact size, a higher performance, and a wider angle, and the like if the conditions and the like described above are fulfilled. Moreover, aiming at a wider angle of view that satisfies the conditional formula (5) in a variable magnification optical system for a compact digital camera makes it difficult to achieve a more compact size, a higher performance, and a higher magnification variation ratio. However, a wider angle can be achieved while achieving a more compact size, a higher performance, and a higher magnification variation ratio by fulfilling the conditions and the like described above.

In each of the embodiments, the zoom lens system ZL includes only refractive lens elements, that is, lens elements that deflect rays incident thereon by refraction (that is, lens elements in which light is deflected at the interface between two media having different refractive indices). Any of those lens elements, however, may be replaced with a lens element of any other type, for example: a diffractive lens element, which deflects rays incident thereon by diffraction; a refractive-diffractive hybrid lens element, which deflects rays incident thereon by the combined effect of refraction and diffraction; or a gradient index lens element, which deflects rays incident thereon with a refractive index distribution within a medium. A gradient index lens element, however, requires that its refractive index be varied within a medium and thus requires a complicated production process. Thus, using a gradient index lens element leads to higher cost. To avoid this, it is preferable to use lens elements made of a material having a uniform refractive index distribution. The zoom lens system ZL includes, other than lens elements, the aperture stop ST as an optical element, and may further include, as necessary, a beam restricting plate (for example, a flair cutter) or the like for cutting unnecessary light.

EXAMPLES

Hereinafter, practical examples of the zoom lens system embodying the present invention will be presented with reference to their construction data and other data. Examples 1 to 5 presented below are numerical examples corresponding respectively to the first to fifth embodiments described above. Thus, the optical construction diagrams (FIGS. 1 to 5) showing the first to fifth embodiments also show the lens constructions of Examples 1 to 5, respectively.

Tables 1 to 10 show the construction data of Examples 1 to 5. Table 11 shows the values for the conditional formulae as actually observed in each example. In the basic optical construction shown in Tables 1, 3, 5, 7, and 9 (where i represents the surface number), ri (i=1, 2, 3, . . . ) represents the radius of curvature (mm) of the i-th surface counted from the object side; di (i=1, 2, 3, . . . ) represents the axial distance (mm) between the i-th and (i+1)th surfaces counted from the object side; Ni (i=1, 2, 3, . . . ) and vi (i=1, 2, 3, . . . ) represent the refractive index (Nd) for the d-line and the Abbe number (vd), respectively, of the optical material that fills the axial distance di. For each of the variable axial distances, that is, those axial distances di that vary with zooming, three values are given, which are the values observed at the wide-angle end (at the shortest-focal-length position) W, at the middle position (at the middle-focal-length position) M, and at the telephoto end (at the longest-focal-length position) T, respectively. Shown together are the values of the focal length f (mm) of the entire system, and the f-number FNO as observed at the just mentioned different focal-length positions W, M, and T.

A surface whose radius of curvature ri is marked with an asterisk (*) is an aspherical surface (a refractive optical surface having an aspherical shape, or a surface that exerts a refractive effect equivalent to that exerted by an aspherical surface, or the like). The surface shape of an aspherical surface is defined by formula (AS) below. Tables 2, 4, 6, 8, and 10 also show the aspherical surface data of each example. Here, it should be noted that the coefficient of any term that does not appear in the tables equals zero, and that, for all the data, E-n stands for "×10$^{-n}$".

$$X(H) = (C0 \cdot H^2)/(1 + \sqrt{1 - \varepsilon \cdot C0^2 \cdot H^2}) + \sum (Aj \cdot H^j) \quad (AS)$$

where
X(H) represents the displacement in the direction of the optical axis AX at the height H (relative to the vertex);

H represents the height in a direction perpendicular to the optical axis AX;

C0 represents the paraxial curvature (=1/ri);

$\varepsilon$ represents the quadric surface parameter; and

Aj represents the aspherical surface coefficient of the j-th order.

FIGS. 6A to 6I through FIGS. 10A to 10I are aberration diagrams of Examples 1 through 5, respectively, when focused at infinity. Of these aberration diagrams, those with numbers suffixed with A, B, or C show the aberrations observed at (W) representing the wide angle end, those with numbers suffixed with D, E, or F show the aberrations observed at (M) representing the middle position, and those with numbers suffixed with G, H, or I show the aberrations observed at (T) representing the telephoto end. Of these aberration diagrams, those with numbers suffixed with A, D, or G show spherical aberration, those with numbers suffixed with B, E, or H show astigmatism, and those with numbers suffixed with C, F, or I show distortion. FNO represents the F number, and Y' (in mm) represents the maximum image height (corresponding to the distance from the optical axis AX) on the light-receiving surface SS of the image sensor SR. In the spherical aberration diagrams, a solid line d represents the spherical aberration (in mm) for the d-line, a dashed line g represents the spherical aberration (in mm) for the g line, and a broken line SC represents the deviation (in mm) from sine condition to be fulfilled. In the astigmatism diagrams, a broken line DM represents the astigmatism (in mm) for the d-line on the meridional surface, and a solid line DS represents the astigmatism (in mm) for the d-line on the sagittal surface. In the distortion diagrams, a solid line represents the distortion (in %) with respect to the d-line.

TABLE 1

| Example 1 | | Focal Length Position | | (W)~(M)~(T) | |
|---|---|---|---|---|---|
| | | f[mm] | | 4.81~20.09~83.97 | |
| | | FNO | | 2.88~3.97~4.60 | |
| i | ri[mm] | | di[mm] | Ni | vi | Symbol |
|---|---|---|---|---|---|---|
| 1 | 59.433 | | 1.810 | 1.84666 | 23.78 | Gr1(+) |
| 2 | 35.058 | | 4.509 | 1.48749 | 70.44 | |
| 3 | 803.632 | | 0.100 | | | |
| 4 | 37.094 | | 3.425 | 1.72916 | 54.67 | |
| 5 | 131.871 | | 1.000~20.294~36.196 | | | |
| 6 | 87.124 | | 1.100 | 1.88300 | 40.79 | Gr2(−) |
| 7 | 7.759 | | 4.069 | | | |
| 8 | −73.960 | | 1.086 | 1.83400 | 37.34 | |
| 9 | 10.466 | | 4.538 | 1.84666 | 23.78 | |
| 10 | −14.836 | | 1.219 | | | |
| 11 | −12.834 | * | 0.800 | 1.88300 | 40.79 | |
| 12 | 227.299 | | 25.655~8.774~1.526 | | | |
| 13 | ∞ | | 1.500 | | | ST |
| 14 | 11.321 | * | 4.254 | 1.58913 | 61.25 | Gr3(+) |
| 15 | −28.732 | | 0.613 | | | |
| 16 | 73.022 | | 1.613 | 1.80518 | 25.46 | |
| 17 | 14.363 | | 1.500 | | | |
| 18 | 26.392 | | 2.648 | 1.49700 | 81.61 | |
| 19 | −21.673 | | 0.950 | | | |
| 20 | −63.474 | * | 1.769 | 1.53048 | 55.72 | |
| 21 | 102.698 | * | 8.104~9.201~12.062 | | | |
| 22 | 15.342 | | 2.054 | 1.49700 | 81.61 | Gr4(+) |
| 23 | 48.631 | | 1.000 | 1.84666 | 23.78 | |
| 24 | 34.048 | | 1.603~14.092~21.575 | | | |
| 25 | 39.205 | * | 2.081 | 1.53048 | 55.72 | Gr5(+) |
| 26 | −106.475 | * | 1.500 | | | |
| 27 | ∞ | | 3.500 | 1.51633 | 64.14 | PT |
| 28 | ∞ | | | | | |

TABLE 2

| Example 1 | Aspherical Surface Data of Surface i (*) | | |
|---|---|---|---|
| | Surface 11 | Surface 14 | Surface 20 |
| ε | 1.0000 | 1.0000 | 1.0000 |
| A4 | 0.98983331E−04 | −0.12402256E−03 | −0.39266234E−04 |
| A6 | 0.10459796E−05 | −0.16313914E−05 | 0.69823968E−05 |
| A8 | 0.40518368E−07 | 0.65355336E−07 | −0.10657575E−06 |
| A10 | −0.36944847E−08 | −0.26065059E−08 | 0.46817103E−09 |
| A12 | 0.87505380E−10 | 0.46099636E−10 | 0.52377210E−20 |
| | Surface 21 | Surface 25 | Surface 26 |
| ε | 1.0000 | 1.0000 | 1.0000 |
| A4 | 0.57528926E−04 | 0.16546507E−03 | 0.38884785E−03 |
| A6 | 0.64657647E−05 | −0.75960315E−06 | 0.88522226E−05 |
| A8 | −0.67517917E−07 | −0.30875127E−06 | −0.12403637E−05 |
| A10 | −0.27984378E−09 | −0.12045379E−07 | 0.15942864E−08 |

TABLE 3

| Example 2 | Focal Length Position | (W)~(M)~(T) | | | |
|---|---|---|---|---|---|
| | f[mm] | 4.79~20.02~83.69 | | | |
| | FNO | 2.88~4.00~4.60 | | | |
| i | ri[mm] | di[mm] | Ni | νi | Symbol |
| 1 | 48.581 | 1.810 | 1.84666 | 23.78 | Gr1(+) |
| 2 | 32.047 | 4.573 | 1.49700 | 81.61 | |
| 3 | 222.108 | 0.100 | | | |
| 4 | 39.979 | 3.170 | 1.72916 | 54.67 | |
| 5 | 151.757 | 1.000~18.208~35.536 | | | |
| 6 | 105.982 | 1.100 | 1.88300 | 40.79 | Gr2(−) |
| 7 | 8.000 | 4.990 | | | |
| 8 | −28.086 * | 1.157 | 1.77250 | 49.36 | |
| 9 | 14.893 | 4.026 | 1.84666 | 23.78 | |
| 10 | −16.692 | 1.810 | | | |
| 11 | −9.535 | 0.800 | 1.88300 | 40.79 | |
| 12 | −25.303 | 23.248~6.936~2.300 | | | |
| 13 | ∞ | 1.300 | | | ST |
| 14 | 10.217 * | 3.218 | 1.58913 | 61.25 | Gr3(+) |
| 15 | −42.527 | 0.282 | | | |
| 16 | 24.879 | 3.743 | 1.84666 | 23.78 | |
| 17 | 8.788 | 1.814 | | | |
| 18 | 17.012 | 2.457 | 1.49700 | 81.61 | |
| 19 | −29.887 | 0.455 | | | |
| 20 | 54.281 | 1.494 | 1.60700 | 27.00 | |
| 21 | 52.649 * | 4.154~11.015~29.199 | | | |
| 22 | 23.777 | 2.335 | 1.49700 | 81.61 | Gr4(+) |
| 23 | −51.696 | 0.833 | 1.77250 | 49.62 | |
| 24 | 1722.416 | 3.927~12.132~3.294 | | | |
| 25 | −53.626 * | 1.715 | 1.53048 | 55.72 | Gr5(+) |
| 26 | −21.711 * | 0.622 | | | |
| 27 | ∞ | 3.500 | 1.51633 | 64.14 | PT |
| 28 | ∞ | | | | |

TABLE 4

| Example 2 | Aspherical Surface Data of Surface i (*) | | |
|---|---|---|---|
| | Surface 8 | Surface 14 | Surface 21 |
| ε | 1.0000 | 1.0000 | 1.0000 |
| A4 | 0.17862614E−03 | −0.14148850E−03 | 0.22145369E−04 |
| A6 | 0.14975036E−05 | −0.12712244E−05 | −0.78254650E−06 |
| A8 | −0.25875070E−07 | 0.66835689E−07 | 0.34587688E−08 |
| A10 | 0.69578312E−09 | −0.28330753E−08 | −0.19088218E−10 |
| A12 | | 0.42252324E−10 | |
| | Surface 25 | Surface 26 | |
| ε | 1.0000 | 1.0000 | |
| A4 | 0.26085576E−03 | 0.70559139E−03 | |

TABLE 4-continued

| Example 2 | Aspherical Surface Data of Surface i (*) | |
|---|---|---|
| A6 | 0.14345204E−04 | 0.57460412E−05 |
| A8 | −0.58674224E−05 | −0.66730244E−05 |
| A10 | 0.18052705E−06 | 0.20742070E−06 |

TABLE 5

| Example 3 | Focal Length Position | (W)~(M)~(T) | | | |
|---|---|---|---|---|---|
| | f[mm] | 4.80~20.09~84.06 | | | |
| | FNO | 2.88~4.00~4.60 | | | |
| i | ri[mm] | di[mm] | Ni | νi | Symbol |
| 1 | 42.148 | 2.00 | 1.846660 | 23.78 | Gr1(+) |
| 2 | 29.744 | 4.82 | 1.497000 | 81.61 | |
| 3 | 114.476 | 0.10 | | | |
| 4 | 47.643 | 3.28 | 1.747989 | 50.80 | |
| 5 | 237.152 | 1.00~19.85~36.05 | | | |
| 6 | 36.810 | 1.10 | 1.883000 | 40.79 | Gr2(−) |
| 7 | 7.432 | 4.82 | | | |
| 8 | −26.569 | 0.90 | 1.804200 | 46.50 | |
| 9 | 8.523 | 3.30 | 1.846660 | 23.78 | |
| 10 | 397.026 | 25.31~6.63~1.02 | | | |
| 11 | ∞ | 2.47 | | | ST |
| 12 | 7.998 * | 2.52 | 1.542054 | 52.38 | Gr3(+) |
| 13 | 39.343 | 1.43 | | | |
| 14 | 17.327 | 0.84 | 1.846660 | 23.78 | |
| 15 | 8.423 | 1.38 | | | |
| 16 | 15.371 | 2.46 | 1.497000 | 81.61 | |
| 17 | −20.462 | 4.58~9.71~36.86 | | | |
| 18 | 16.997 * | 1.93 | 1.530480 | 55.72 | Gr4(+) |
| 19 | 111.561 | 1.20 | 1.620170 | 24.01 | |
| 20 | 39.993 * | 7.65~15.04~6.99 | | | |
| 21 | ∞ | 3.50 | 1.516330 | 64.14 | PT |
| 22 | ∞ | 1.00 | | | |

TABLE 6

| Example 3 | Aspherical Surface Data of Surface i (*) | | |
|---|---|---|---|
| | Surface 12 | Surface 18 | Surface 20 |
| ε | 1.0000 | 1.0000 | 1.0000 |
| A4 | −1.64641E−04 | −2.05221E−04 | −1.48476E−04 |
| A6 | −1.25273E−07 | −3.78968E−07 | 1.05013E−06 |
| A8 | −1.52786E−07 | −6.13299E−08 | −3.01859E−07 |
| A10 | 6.35841E−09 | −1.70589E−09 | 1.25913E−08 |
| A12 | −1.13240E−10 | | −2.82626E−10 |

TABLE 7

| Example 4 | Focal Length Position | (W)~(M)~(T) | | | |
|---|---|---|---|---|---|
| | f[mm] | 4.80~20.09~84.06 | | | |
| | FNO | 2.88~4.00~4.60 | | | |
| i | ri[mm] | di[mm] | Ni | νi | Symbol |
| 1 | 41.043 | 2.00 | 1.846660 | 23.78 | Gr1(+) |
| 2 | 30.042 | 5.15 | 1.497000 | 81.61 | |
| 3 | 196.760 | 0.10 | | | |
| 4 | 49.949 | 3.04 | 1.729160 | 54.67 | |
| 5 | 179.225 | 1.00~19.56~35.07 | | | |
| 6 | 81.495 * | 1.10 | 1.883000 | 40.79 | Gr2(−) |
| 7 | 7.715 | 5.10 | | | |
| 8 | −23.239 | 0.90 | 1.804200 | 46.50 | |
| 9 | 10.159 | 3.50 | 1.846660 | 23.78 | |

TABLE 7-continued

| | | | | | | |
|---|---|---|---|---|---|---|
| 10 | −94.720 | | 26.95~7.361~1.00 | | | |
| 11 | ∞ | | 1.93 | | | ST |
| 12 | 8.431 | * | 2.69 | 1.566426 | 44.77 | Gr3(+) |
| 13 | 183.038 | | 1.46 | | | |
| 14 | 24.645 | | 0.66 | 1.846660 | 23.78 | |
| 15 | 8.599 | | 1.29 | | | |
| 16 | 13.527 | | 2.44 | 1.497000 | 81.61 | |
| 17 | −25.655 | | 5.71~11.05~35.920 | | | |
| 18 | 18.150 | * | 1.97 | 1.530480 | 55.72 | Gr4(+) |
| 19 | 304.054 | | 1.20 | 1.620170 | 24.01 | |
| 20 | 51.966 | * | 6.82~14.22~8.94 | | | |
| 21 | ∞ | | 3.50 | 1.516330 | 64.14 | PT |
| 22 | ∞ | | | | | |

TABLE 8

| Example 4 | Aspherical Surface Data of Surface i (*) | | | |
|---|---|---|---|---|
| | Surface 6 | Surface 12 | Surface 18 | Surface 20 |
| ε | 1.0000 | 1.0000 | 1.0000 | 1.0000 |
| A4 | 3.03894E−05 | −1.49986E−04 | −1.87373E−04 | −1.31732E−04 |
| A6 | −8.55847E−08 | 1.51177E−07 | −1.91921E−06 | 5.13724E−07 |
| A8 | 4.26161E−09 | −1.40503E−07 | −4.52784E−08 | −2.56037E−07 |
| A10 | −9.71369E−11 | 5.63627E−09 | −8.98660E−10 | 8.20876E−09 |
| A12 | 5.67605E−13 | −9.17834E−11 | | −1.32652E−10 |

TABLE 9

| Example 5 | | Focal Length Position f[mm] FNO | (W)~(M)~(T) 4.90~20.50~85.77 2.88~4.25~5.00 | | | |
|---|---|---|---|---|---|---|
| i | ri[mm] | di[mm] | Ni | νi | Symbol | |
| 1 | 63.915 | 1.80 | 1.846660 | 23.78 | Gr1(+) | |
| 2 | 28.080 | 4.83 | 1.497000 | 81.61 | | |
| 3 | 233.282 | 0.10 | | | | |
| 4 | 33.978 | 3.78 | 1.875746 | 36.44 | | |
| 5 | 183.154 | 1.00~17.51~31.47 | | | | |
| 6 | 38.267 | 1.10 | 1.883000 | 40.79 | Gr2(−) | |
| 7 | 8.058 | 3.82 | | | | |
| 8 | −28.675 | 0.80 | 1.755000 | 52.32 | | |
| 9 | 7.176 | 3.64 | 1.846660 | 23.78 | | |
| 10 | −202.732 | 1.59 | | | | |
| 11 | −12.929 | 0.80 | 1.883000 | 40.79 | | |
| 12 | −34.046 | 19.51~7.01~1.50 | | | | |
| 13 | ∞ | 1.50 | | | ST | |
| 14 | 9.541 | * | 4.22 | 1.581098 | 59.45 | Gr3(+) |
| 15 | −29.657 | 0.43 | | | | |
| 16 | 35.281 | 1.96 | 1.861363 | 29.96 | | |
| 17 | 9.162 | 1.50 | | | | |
| 18 | 12.901 | 3.76 | 1.497000 | 81.61 | | |
| 19 | −10.777 | 1.61 | | | | |
| 20 | −14.876 | * | 1.70 | 1.530480 | 55.72 | |
| 21 | 185.577 | * | 4.03~10.67~23.33 | | | |
| 22 | 10.777 | 1.40 | 1.580849 | 41.45 | Gr4(+) | |
| 23 | 8.984 | 1.49 | 1.583467 | 66.40 | | |
| 24 | 14.912 | 2.27~11.11~14.34 | | | | |
| 25 | −39.069 | * | 2.00 | 1.530480 | 55.72 | Gr5(+) |
| 26 | −15.474 | * | 1.00 | | | |
| 27 | ∞ | 3.50 | 1.516330 | 64.14 | PT | |
| 28 | ∞ | 1.00 | | | | |

TABLE 10

| Example 5 | Aspherical Surface Data of Surface i (*) | | |
|---|---|---|---|
| | Surface 14 | Surface 20 | Surface 21 |
| ε | 1.0000 | 1.0000 | 1.0000 |
| A4 | −2.24371E−04 | 2.31869E−05 | 1.67945E−04 |
| A6 | −3.49151E−06 | 8.27307E−06 | 7.54779E−06 |
| A8 | 1.63950E−07 | 2.60849E−09 | 9.33920E−10 |
| A10 | −7.85347E−09 | | 6.27477E−10 |
| A12 | 1.41432E−10 | | |
| | Surface 25 | Surface 26 | |
| ε | 1.0000 | 1.0000 | |
| A4 | −5.70495E−05 | 3.16891E−04 | |
| A6 | −4.11112E−05 | −3.72863E−05 | |
| A8 | 4.75781E−06 | 5.05310E−06 | |
| A10 | −1.65397E−07 | −1.75491E−07 | |

TABLE 11

| | Conditional Formula | Example 1 | Example 2 | Example 3 | Example 4 | Example 5 |
|---|---|---|---|---|---|---|
| (1), (1a) | f1/fw | 11.871 | 11.819 | 12.629 | 12.283 | 10.333 |
| (2), (2a) | Ndave | 1.862 | 1.846 | 1.845 | 1.845 | 1.842 |
| (3), (3a) | f3/f4 | 0.283 | 0.247 | 0.299 | 0.321 | 0.290 |
| (4) | ft/fw | 17.486 | 17.467 | 17.512 | 17.514 | 17.503 |
| (5) | Y′/fw | 0.750 | 0.752 | 0.750 | 0.750 | 0.735 |

What is claimed is:

1. A variable magnification optical system for forming an optical image of an object on a light-receiving surface of an image sensor, said variable magnification optical system includes: from an object side, at least a first lens unit having a positive optical power, a second lens unit having a negative optical power, a third lens unit having a positive optical power, and a fourth lens unit having a positive optical power, wherein, in magnification variation from a wide angle end to a telephoto end, at least the first lens unit moves, wherein the variable magnification optical system has a five-unit construction including a fifth lens unit which has a positive optical power and which is arranged to an image side of the fourth lens unit, wherein, in variable magnification from the wide angle end to the telephoto end, the fifth lens unit is kept in fixed position, and wherein conditional formulae (1) and (2) below are fulfilled, $$6.0 < f1/fw < 20.0 \quad (1)$$

$$1.83 < Nd_{ave} \quad (2)$$

where f1 represents a focal length of the first lens unit, fw represents a focal length of the entire system at the wide angle end, and $Nd_{ave}$ represents an average refractive index for a d-line among all lens elements included in the second lens unit.

2. The variable magnification optical system according to claim 1, wherein the fifth lens unit consists essentially of one positive lens element.

3. A variable magnification optical system for forming an optical image of an object on a light-receiving surface of an image sensor, said variable magnification optical system includes: from an object side, at least a first lens unit having a positive optical power, a second lens unit having a negative optical power, a third lens unit having a positive optical power, and a fourth lens unit having a positive optical power, wherein, in magnification variation from a wide angle end to a telephoto end, at least the first lens unit moves, and wherein conditional formulae (1), (2a), and (5) below are fulfilled:

$$6.0 < f1/fw < 20.0 \quad (1)$$

$$1.85 < Nd_{ave} \quad (2a)$$

$$0.735 < Y'/fw \quad (5)$$

where f1 represents a focal length of the first lens unit, fw represents a focal length of the entire system at the wide angle end, $Nd_{ave}$ represents an average refractive index for a d-line among all lens elements included in the second lens unit, and Y' represents the maximum image height.

4. A variable magnification optical system for forming an optical image of an object on a light-receiving surface of an image sensor, said variable magnification optical system includes: from an object side, at least a first lens unit having a positive optical power, a second lens unit having a negative optical power, a third lens unit having a positive optical power, and a fourth lens unit having a positive optical power, wherein, in magnification variation from a wide angle end to a telephoto end, at least the first lens unit moves, and wherein conditional formulae (1), (2) and (4) below are fulfilled:

$$6.0 < f1/fw < 20.0 \quad (1)$$

$$1.83 < Nd_{ave} \quad (2)$$

$$ft/fw < 17.467 \quad (4)$$

where f1 represents a focal length of the first lens unit, $Nd_{ave}$ represents an average refractive index for a d-line among all lens elements included in the second lens unit, ft represents a focal length of the entire system at the telephoto end, and fw represents the focal length of the entire system at the wide angle end.

5. An image taking apparatus comprising a variable magnification optical system for forming an optical image of an object, and an image sensor for converting the optical image into an electrical signal, wherein the variable magnification optical system includes: from an object side, at least a first lens unit having a positive optical power, a second lens unit having a negative optical power, a third lens unit having a positive optical power, and a fourth lens unit having a positive optical power, wherein, in magnification variation from a wide angle end to a telephoto end, at least the first lens unit moves, wherein the variable magnification optical system has a five-unit construction including a fifth lens unit which has a positive optical power and which is arranged to an image side of the fourth lens unit, wherein, in variable magnification from the wide angle end to the telephoto end, the fifth lens unit is kept in fixed position, and wherein conditional formulae (1) and (2) below are fulfilled, $$6.0 < f1/fw < 20.0 \quad (1)$$

$$1.83 < Nd_{ave} \quad (2)$$

where f1 represents a focal length of the first lens unit, fw represents a focal length of the entire system at the wide angle end, and $Nd_{ave}$ represents an average refractive index for a d-line among all lens elements included in the second lens unit.

6. The image taking apparatus according to claim 5 wherein the fifth lens unit consists essentially of one positive lens element.

7. An image taking apparatus comprising a variable magnification optical system for forming an optical image of an object, and an image sensor for converting the optical image into an electrical signal, wherein the variable magnification optical system includes: from an object side, at least a first lens unit having a positive optical power, a second lens unit having a negative optical power, a third lens unit having a positive optical power, and a fourth lens unit having a positive optical power, wherein, in magnification variation from a wide angle end to a telephoto end, at least the first lens unit moves, wherein conditional formulae (1), (2a), and (5) below are fulfilled:

$$6.0 < f1/fw < 20.0 \quad (1)$$

$$1.85 < Nd_{ave} \quad (2a)$$

$$0.735 < Y'/fw \quad (5)$$

where f1 represents a focal length of the first lens unit, fw represents a focal length of the entire system at the wide angle end, $Nd_{ave}$ represents an average refractive index for a d-line among all lens elements included in the second lens unit, and Y' represents the maximum image height.

8. An image taking apparatus comprising a variable magnification optical system for forming an optical image of an object, and an image sensor for converting the optical image into an electrical signal, wherein the variable magnification optical system includes: from an object side, at least a first lens unit having a positive optical power, a second lens unit having a negative optical power, a third lens unit having a positive optical power, and a fourth lens unit having a positive optical power, wherein, in magnification variation from a wide angle end to a telephoto end, at least the first lens unit moves, wherein conditional formulae (1), (2), (4) and (5) below are fulfilled:

$$6.0 < f1/fw < 20.0 \quad (1)$$

$$1.83 < Nd_{ave} \quad (2)$$

$$ft/fw < 10 \quad (4)$$

$$0.735 < Y'/fw \quad (5)$$

where f1 represents a focal length of the first lens unit, $Nd_{ave}$ represents an average refractive index for a d-line among all lens elements included in the second lens unit, ft represents a focal length of the entire system at the telephoto end, fw represents the focal length of the entire system at the wide angle end, and Y' represents the maximum image height.

* * * * *

UNITED STATES PATENT AND TRADEMARK OFFICE
CERTIFICATE OF CORRECTION

PATENT NO. : 7,339,748 B2
APPLICATION NO. : 11/235623
DATED : March 4, 2008
INVENTOR(S) : Mamoru Terada and Toru Nakatani It is certified that error appears in the above-identified patent and that said Letters Patent is hereby corrected as shown below:

Column 19:
Line 33, claim 4, delete "ft / fw < 17.467" and insert -- ft / fw > 17.467 --.

Column 20:
Line 53, claim 8, delete "ft / fw < 10" and insert -- ft / fw > 10 --.

Signed and Sealed this

Third Day of June, 2008

JON W. DUDAS
*Director of the United States Patent and Trademark Office*